(12) United States Patent
Wu et al.

(10) Patent No.: US 12,105,746 B1
(45) Date of Patent: Oct. 1, 2024

(54) SYSTEM FOR SURVEYING SECURITY ENVIRONMENTS

(71) Applicant: Dropzone.ai, Inc., Seattle, WA (US)

(72) Inventors: Xue Jun Wu, Seattle, WA (US); Changhwan Oh, Shoreline, WA (US); Eric Joseph Hammerle, Kirkland, WA (US); Robert Rowland Foley, Long Island City, NY (US)

(73) Assignee: Dropzone.ai, Inc., Seattle, WA (US)

( * ) Notice: Subject to any disclaimer, the term of this patent is extended or adjusted under 35 U.S.C. 154(b) by 0 days.

(21) Appl. No.: 18/652,093

(22) Filed: May 1, 2024

(51) Int. Cl.
  *G06F 16/332* (2019.01)
  *H04L 9/40* (2022.01)

(52) U.S. Cl.
  CPC ...... *G06F 16/3329* (2019.01); *H04L 63/1425* (2013.01); *H04L 63/20* (2013.01)

(58) Field of Classification Search
  CPC .. G06F 16/3329; H04L 63/1425; H04L 63/20
  See application file for complete search history.

(56) References Cited

U.S. PATENT DOCUMENTS

| | | | |
|---|---|---|---|
| 10,198,433 B2 * | 2/2019 | Weston | G06F 3/0482 |
| 11,916,767 B1 | 2/2024 | Wu et al. | |
| 2003/0093276 A1 * | 5/2003 | Miller | G10L 15/22 |
| | | | 704/E15.04 |
| 2015/0347569 A1 * | 12/2015 | Allen | G06F 16/24578 |
| | | | 707/728 |
| 2018/0240043 A1 | 8/2018 | Majumdar et al. | |
| 2022/0391595 A1 * | 12/2022 | Shevelev | G06N 3/08 |
| 2023/0208971 A1 | 6/2023 | Te Booij et al. | |
| 2023/0244869 A1 | 8/2023 | Neumann | |
| 2023/0359789 A1 | 11/2023 | Andre et al. | |

OTHER PUBLICATIONS

Office Communication for U.S. Appl. No. 18/230,123 mailed Sep. 25, 2023, 9 Pages.
Office Communication for U.S. Appl. No. 18/230,123 mailed Dec. 12, 2023, 22 Pages.

* cited by examiner

*Primary Examiner* — Abiy Getachew
(74) *Attorney, Agent, or Firm* — John W. Branch; Branch Partners PLLC

(57) ABSTRACT

Embodiments are directed to surveying security environments. A subject index that includes entries may be generated based on a survey of a content system. A question a client may be matched to entries in the subject index. A prompt associated with the content system may be generated based on the entries, the data sources, or the question. Query models may be employed to obtain data associated with the question from the data sources. Other prompts may be generated based on the data from the data sources to generate candidate answers based on the question and the data from the data sources. An evaluation prompt that includes the candidate answers and the question may be generated to rank the candidate answers for correctness. Answers may be determined based on the ranking of the candidate questions such that top ranked candidate answers are provided to the client.

27 Claims, 23 Drawing Sheets

SYSTEM FOR SURVEYING SECURITY ENVIRONMENTS

TECHNICAL FIELD

These innovations relate generally to computer associated security, and more particularly, but not exclusively, to surveying information technology security environments.

BACKGROUND

As organizations become increasingly dependent on heterogenous computer environments that may include complex networks, remote services, distributed services, or the like, managing and monitoring infrastructure access in such computing environments can become both increasingly critically important and increasingly complex. Difficulties associated with managing computing environments may not be new, however, interconnections among remote offices, data centers, remote employees, remote customers, and so on, have resulted in organizations relying more broadly on heterogeneous distributed services, or the like. To help manage their information technology infrastructure, organizations have developed various strategies to protect their technology and infrastructure from direct threats or indirect threats. One practice is to install monitoring technology that can observe or detect various activities, behaviors, or operational quality in their computing environments.

However, as these computing environments have grown in size or complexity, deploying or integrating security systems that leverage the enormous amount of information collected by monitoring systems may be disadvantaged by variations in monitoring tools, variable data formats, customized/distinct local configurations, insufficient documentation, elastic/dynamic network environments, or the like. Accordingly, in some cases, deploying security management tools in some computing environments may require significant customization to be effective. Likewise, while some organizational security policies, or the like, may be captured or represented in formal documentation, some policies may be informal or absent from official documentation. Thus, it is with respect to these considerations and others that these present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
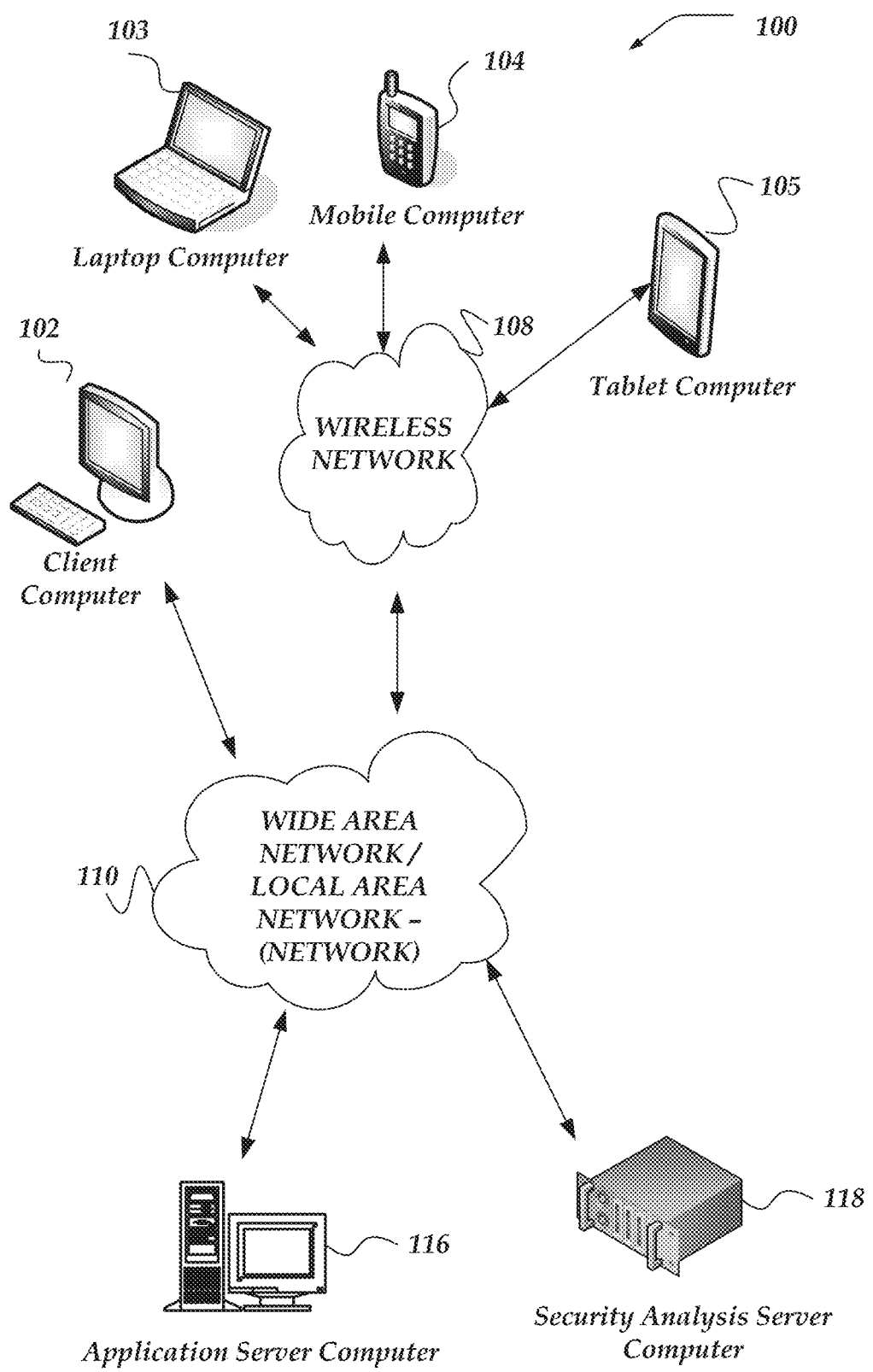
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or "prompt dataset" refer to one or more data structures that contain or represent prompt information that may be provided to LLMs.

As used herein, the term "event," or "event information" as used herein refer one or more data structures or messages that may report outcomes, conditions, or occurrences that may be detected or observed in a networked computing environment. Event information may include additional context information associated with an event, such as event source, event type, or the like. Organizations may deploy various systems may be configured to monitor various types of events depending on needs of an industry or technology area. For example, information technology services may generate events in response to one or more conditions, such as, computers going offline, memory over-utilization, CPU over-utilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof. Events may be provided using one or more messages, emails, telephone calls, library function calls, application programming interface (API) calls, including, any signals provided to indicate that an event has occurred. One or more third party and/or external systems may be configured to generate event messages.

As used herein, the term "question" refers to text based submissions provided by clients such as users or services. In some cases, questions may be comprised on unstructured natural language text. Also, in some cases, questions may be structured or based on templates.

As used herein, the term "query" refers to machine generated statements that may be provided to content systems, including security information and event management systems (SIEMs), messaging systems, file systems, or the like. Query may be automatically generated based on, among other thing, questions provided by clients. Typically, queries may be composed or formatted to conform to one or more particular queries languages supported by a particular content system. For example, if the content system is a SIEM, queries may be formatted to conform to a query language supported by the SIEM. Also, for example, if the content system is based on RDBMS the query may conform to the SQL or SQL-like languages.

As used herein, the term "answer" refers to a report or statement that may be asserted to be responsive to a question provided by a client.

As used herein, the term "response" refers to the text, data, or the like, provided by a content system (e.g., SIEM, messaging system, or the like) responsive to one or more queries.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to systems for surveying security environments. In one or more of the various embodiments, a subject index that includes a plurality of entries may be generated based on a survey of a content system such that the plurality of entries may be associated with a plurality of data sources of the content system and such that each entry may be associated with one or more subjects.

In one or more of the various embodiments, a query engine may be arranged to perform actions, further including: using a question provided by a client to perform further actions, including: matching the question to one or more entries in the subject index based on a similarity of the question to a subject associated with the one or more entries; determining one or more data sources associated with the question based on the one or more entries; generating a prompt associated with the content system based on the one or more entries, the one or more data sources, and the question; employing one or more query models that are trained by the prompt to obtain data associated with the question from the one or more data sources; generating one or more other prompts based on the data from the one or more data sources such that the one or more other prompts retrain the one or more query models to generate one or more candidate answers based on the question and the data from the one or more data sources; generating an evaluation prompt that includes the one or more candidate answers and the question such that the evaluation prompt retrains the one or more query models to rank the one or more candidate answers for correctness; determining one or more answers from the one or more candidate answers based on the ranking of the one or more candidate questions such that one or more top ranked candidate answers are provided to the client; or the like.

In one or more of the various embodiments, one or more query agents may be determined based on one or more of the content system or the one or more data sources. In some embodiments, one or more of the one or more prompts, the one or more other prompts, or the evaluation prompt may be provided to the one or more query agents. In some embodiments, the one or more query agents may be employed to execute one or more actions to submit the one or more prompts, the one or more other prompts, or the evaluation prompt to the one or more query models such that the one or more query agents obtain one or more responses from the one or more query models.

In one or more of the various embodiments, generating the subject index may include, determining one or more subjects associated with each data source based on one or more survey models and one or more survey prompts. In some embodiments, one or more other characteristics of each data source may be determined based on the one or more survey models and the one or more survey prompts such that the one or more other characteristics include one or more of data source name, column names, column data types, number of records in data sources, cardinality of each column, or one or more sample records. In some embodiments, the one or more subjects and the one or more characteristics of each data source may be included in an entry that may be stored in the subject index.

In one or more of the various embodiments, a sample question prompt that includes information from a data source may be generated. In some embodiments, the sample question prompt may be submitted to train a survey model to generate one or more example questions that may be associated with the data source. In some embodiments, the one or more sample questions may be included in an entry associated with the data source.

In one or more of the various embodiments, determining the one or more answers from the one or more candidate answers may include: determining an absence of suitable candidate answers based on the evaluation prompt such that the one or more candidate answers may be determined to be incorrect; generating one or more additional prompts based on the data from the one or more data sources such that the one or more additional prompts retrain the one or more query models to generate one or more additional candidate answers; generating another evaluation prompt that includes the one or more additional candidate answers and the question such that the other evaluation prompt retrains the one or more query models to rank the one or more additional candidate answers for correctness; or the like.

In one or more of the various embodiments, employing the one or more query models may include: determining one or more large language models associated with the one or more query models; submitting one or more of the prompt, the one or more other prompts, or the evaluation prompt to the one or more large language models such that the one or more of the prompt, the one or more other prompts, or the evaluation prompt may train the one or more large language models to generate responses associated with the question.

In one or more of the various embodiments, training the prompt to obtain data associated with the question may include: updating the prompt to include one or more sample queries that conform to a query language that may be compatible with the content system; employing the prompt to train the one or more query models to generate one or more queries based on the one or more sample queries and the question; submitting the one or more queries to the content system to obtain the data from the one or more data sources; or the like.

In one or more of the various embodiments, the content system may be one or more of a security information management system, a messaging system, a project management system, a version control system, a file system, or the like.

In one or more of the various embodiments, generating the subject index may include: traversing the plurality of data sources associated with the content system; generating an entry for each data source such that a data source includes one or more of a table, a message, a conversation, a collection of messages, a file, a file system directory. In some embodiments, the entry for each data source may be stored in the subject index.

In one or more of the various embodiments, providing the question may include: providing a natural language interrogative statement from the client suggest that the subject matter associated with the question includes one or more of a security policy, a user behavior, a security metric, a performance metric, or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, security analysis server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, security analysis server computer 118, or other computers.

Client computers 102-105 may further be configured to include a client application that enables an end-user to log into an end-user account that may be managed by another computer, such as application server computer 116, security analysis server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to security analysis server computer 118. Also, client computers may be arranged to enable users to display reports, interactive user-interfaces, results provided by security analysis server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, security analysis server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and security analysis server computer 118 are described in more detail below in conjunction with FIG. 3. Although FIG. 1 illustrates application server computer 116, or security analysis server computer 118 each as a single computer, the innovations or embodiments are not so limited. For example, one or more functions of application server computer 116, or security analysis server computer 118, or the like, may be distributed across one or more distinct network computers. Moreover, in one or more embodiments, security analysis server computer 118 may be implemented using a plurality of network computers. Further, in one or more of the various embodiments, application server computer 116, or security analysis server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
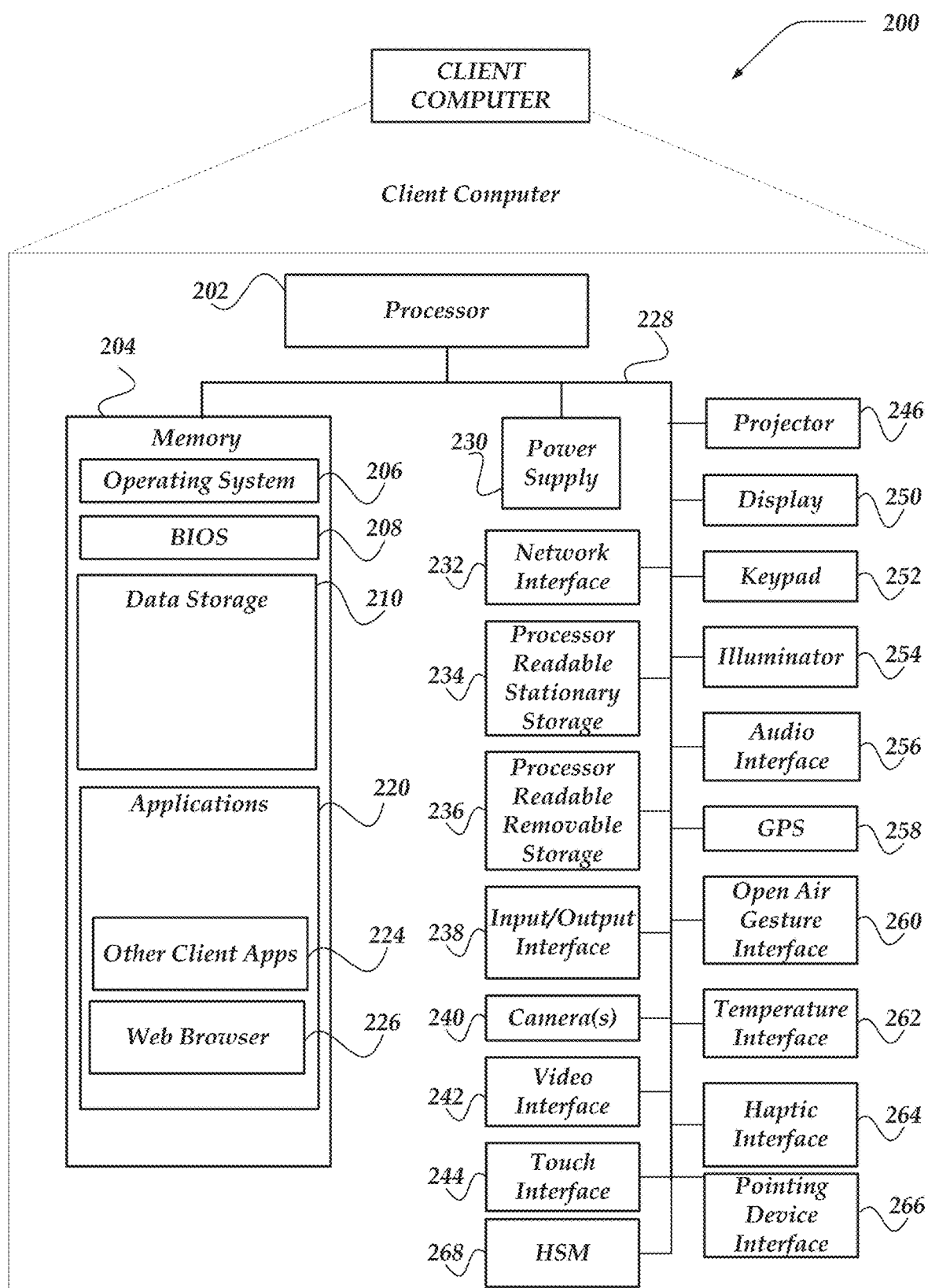
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
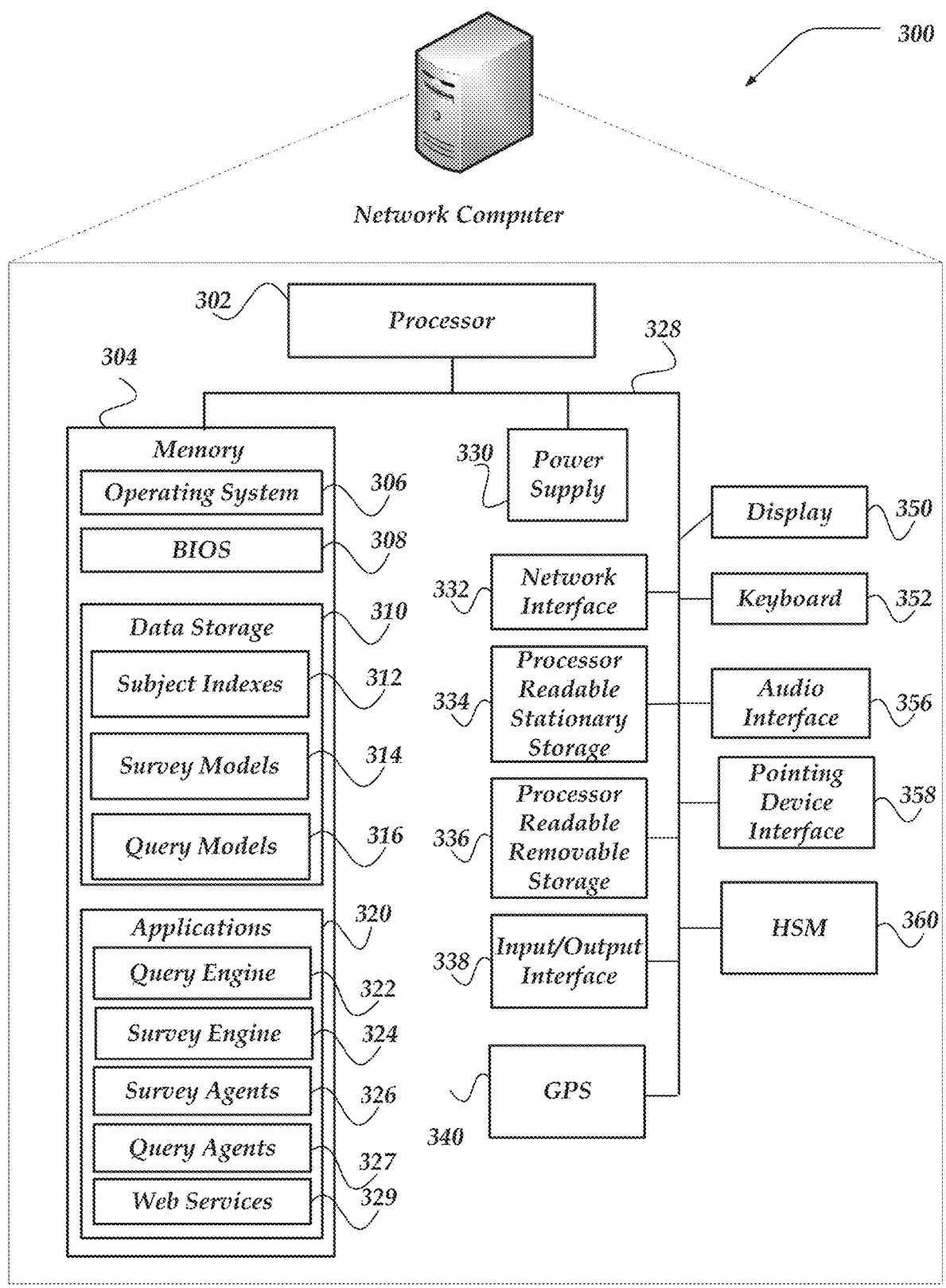
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, security analysis server computer 118 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, query engine 322, survey engine 324, survey agents 326, query agents 327, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, subject indexes 312, survey models 314, query models 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include query engine 322, survey engine 324, survey agents 326, query agents 327, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, query engine 322, survey engine 324, survey agents 326, query agents 327, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to query engine 322, survey engine 324, survey agents 326, query agents 327, web services 329, or the like, may be provisioned and de-commissioned automatically.

Also, in one or more of the various embodiments, query engine 322, survey engine 324, survey agents 326, query agents 327, web services 329, or the like, may be located in virtual servers running in a cloud-based computing environment rather than being tied to one or more specific physical network computers. Likewise, in some embodiments, one or more of query engine 322, survey engine 324, survey agents 326, query agents 327, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
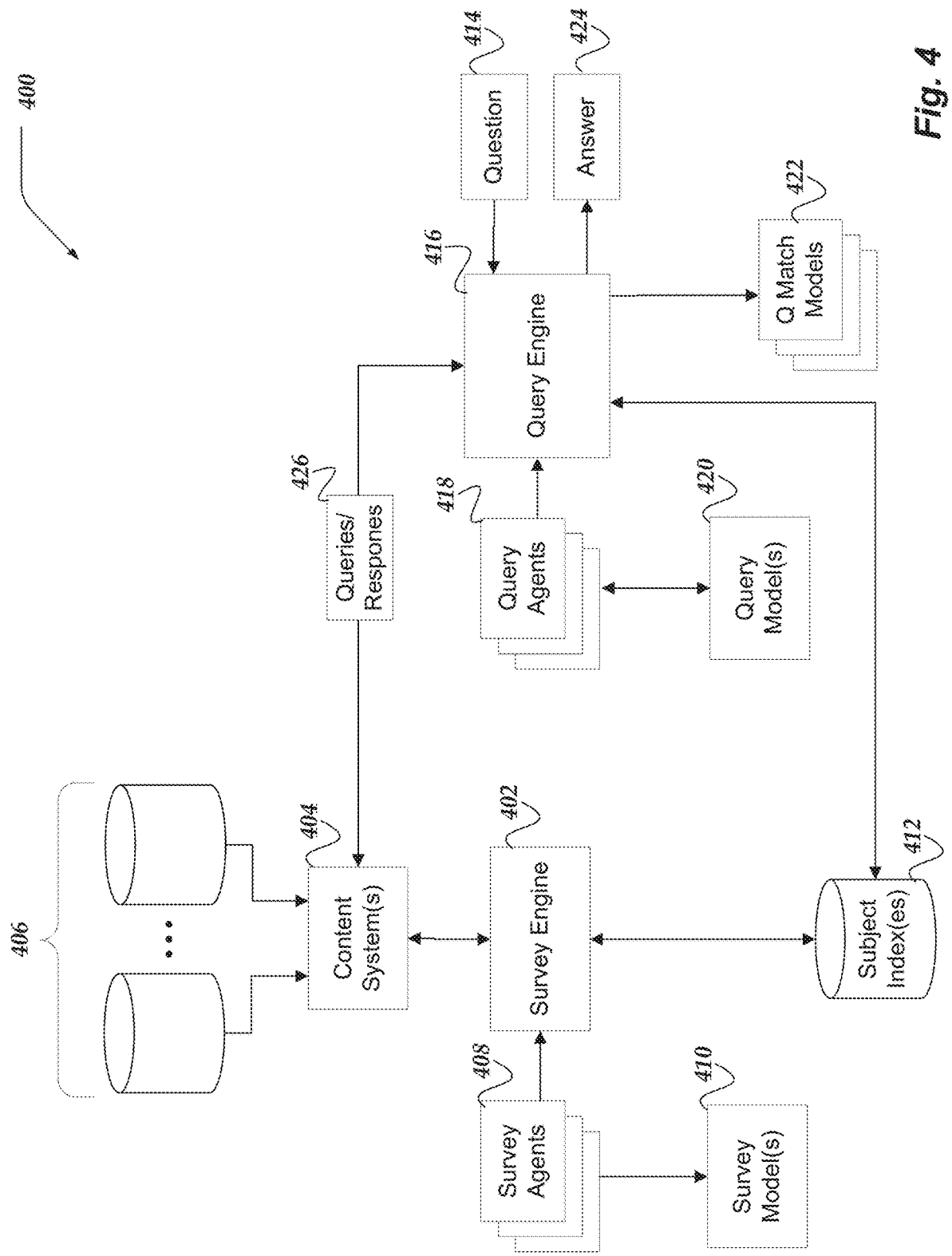
FIG. 4 illustrates a logical architecture of a system for surveying security environments in accordance with one or more of the various embodiments.

FIG. 4 illustrates a logical architecture of system 400 for surveying security environments in accordance with one or more of the various embodiments.

In some cases, organizations may employ one or more systems for surveying security environments to support security analysis, user activity monitoring, service/application performance monitoring, event/alert triage, or the like, associated with their computing environments. Conventionally, organizations may employ various applications or services, such as, security information and event management systems (SIEMs) to collect or manage security related information. In some cases, this information may include events, alerts, log files, captured network traffic, activity records, or the like. In some cases, for some embodiments, security information or event management systems may be specialized services directed towards collecting or organizing information associated with actions or behaviors of applications, services, users, or the like.

In some cases, security information and event management systems may be locally customized to meet the local requirements of organizations. In some cases, new or updated SIEMs may be deployed into existing or legacy environments such that they may be customized to match one or more requirements that may be based on configuration or customization that may be carried over from legacy systems such that the reasoning or purpose for the customization may be long forgotten or otherwise absent from formal documentation. In some cases, these types of custom configurations may include tables, table names, descriptions, labels, field names, record formats, file formats, or the like, that have non-intuitive values. Accordingly, in such cases, if a person reviews the security information and event management system configuration, the purpose of some tables, logs, or files may be non-obvious or misleading. Also, in some cases, tables or fields may be overloaded or reused such that their table names or field names may not effectively describe the data within, its purpose, or significance with respect to the organization's computing environment or operations.

Likewise, in some cases, after a formal SIEM deployment has occurred, one or more ad hoc configuration changes may be introduced overtime as organizations adapt the initial installation to unexpected events or conditions may be encountered. In some cases, formal documentation of such changes may be omitted or otherwise neglected. Accordingly, in some cases, the purpose or reasoning underlying some policies may be left to become institutional knowledge that may depend on particular persons.

Also, in some embodiments, organizations may employ messaging systems, internal blogs, email systems, or the like, that informally accumulate information associated with policies or practices of the organizations. For example, email or message conversations between users may include discussions associated with security policies or security configurations within organizations. Further, in some cases, communication information may include explicit requests for approval, granting of requests, authentication, approvals, dismissals or acknowledgments of alerts or alert conditions, or the like. Accordingly, in some embodiments, there may be one or more implicit policies that may be described or effected in the communications that may not be included in other formal or official policy documents or policy configurations.

Moreover, in general, security information and event management systems or communication systems (e.g., email systems, messaging systems, chat systems, or the like) may be referred to as content systems. Herein, content systems may be considered applications or services that may generate or manage information associated with security concerns or operations in computing environments. In some cases, content systems may be specialized SIEMs or more generalized communication systems, such as, email systems, messaging/chat systems, or the like. In some embodiments, content systems may include general purpose document management systems, file systems, databases, or the like.

Accordingly, in some embodiments, systems for surveying security environments may include survey engines directed to discovering how information associated with computing environments may be stored or otherwise organized in various content systems. Accordingly, in some embodiments, survey systems, such as system 400 may include one or more survey engines, such as survey engine 402. In some embodiments, survey engines may be arranged to communicate with one or more content systems, such as content system 404. In this example, for some embodiments, content system 404 may employ one or more data sources such as data sources 406 for storing information associated with the content systems.

In some embodiments, survey engine 402 may be arranged to employ one or more survey agents, such as survey agents 408 for examining content systems. In some embodiments, survey agents 408 may be arranged to employ one or more survey models, such as survey models 410 used to examine content systems.

In some embodiments, survey engine 402 may be arranged to generate summary information regarding the content systems or information discovered within content systems. Accordingly, in some embodiments, this summary information may be collected or otherwise made available in one or more subject indexes such as subject index 412. In some embodiments, summary information stored in subject indexes may include information that describes one or more characteristics of the data sources being surveyed. In some embodiments, this may include information about the structure of the data sources. For example, if the data sources arrange/store data using tables, files, directories, or the like, associated subject index entries may describe the structure, format, data types, table names, column numbers, or the like. In some cases, for some embodiments, the particular information stored in a subject index entry may vary depending on the format or structure of the data sources. For example, if the data sources may be characterized as tables (or table-like), the associated subject index entries may include information about columns, column data types, cardinality, or the like. Similarly, for example, if the data sources may be files or documents, the associated subject index entries may include filenames, file sizes, locations (URIS, file system paths, or the like), format/file type, or the like. Also, in some embodiments, subject index entries may include actual content samples from the data sources, summary information, or the like.

In some embodiments, survey engines may be arranged to employ survey agents and survey models to further examine content. In some embodiments, survey models may include or reference generative AI systems (e.g, large language models) that may be employed to infer additional information about the content. For example, in some embodiments, survey agents may employ survey models to characterize data sources, including predicting the type of questions that the content may be suitable for answering. For example, in some embodiments, survey models may expose interfaces that enable survey agents to access large language models, or the like. In some embodiments, survey models may be configured to enable filters, heuristics, machine learning classifiers, pattern matching, scoring, or the like, to applied to questions, queries, answers, or responses. Accordingly, in some embodiments, survey engines may be arranged to employ one or more survey models that may be adapted to local circumstances or local requirements. For example, in some cases, for some embodiments, an organization may restrict the use of remote or third-party generative artificial intelligence systems and require generative artificial intelligence systems to be local. Accordingly, in this example, survey models may be configured to employ locally hosted generative artificial intelligence systems rather remote generative artificial intelligence systems.

In some embodiments, survey engines may be arranged to periodically or continuously survey one or more content systems to discover one or more characteristics or configurations of an organization's computing environment or security policies. Accordingly, in some embodiments, if SIEM tables may be updated or modified, survey engines may be arranged to detect or determine such modifications and update subject indexes to reflect the modifications. Likewise, in some embodiments, during the normal course of operation, SIEMs may collect new data that may be examined by survey engines. Accordingly, survey engines may re-examine the SIEM data that may resulting in updated subject index entries.

Also, in some embodiments, query engines, such as query engine 416 may be arranged to receive questions, such as question 414 from clients, such as one or more users or one or more services. In some embodiments, in some cases, questions may be natural language statements provided directly by users. Also, in some embodiments, questions may be provided by services, applications, or the like. In some cases, user interfaces may be arranged to submit a question based on user interactions with user interface controls. For example, in some embodiments, user interfaces may include buttons, sliders, or the like, that map to questions or question expressions. Also, in some embodiments, questions may be formed from templates, or the like, such that portions of the questions may be based on merging the templates with provided parameter values. Also, in some embodiments, systems for surveying security environments may provide user interfaces that enable users to enter natural languages questions as free form text. Accordingly, in some embodiments, questions, such as question 414 may be submitted to query engines, such as query engine 416.

In some embodiments, query engines may be arranged to compare the text of questions to subject index entries to determine which subject index entries may be related to the question. In some embodiments, query engines may be arranged to compare the content of the question to summary information, descriptions, or the like, that may be stored with subject index entries. Also, in some embodiments, survey engines may be arranged to compare the questions with example questions that may be included in the subject index entries. In some embodiments, query engines may be arranged to execute the comparison by employing one or more question match models, such as question match models 422. In some embodiments, question match models may execute one or more NLP actions, classifications, or the like, to determine a match with the subject index entries.

In some embodiments, example questions included in subject index entries may be matched with questions provided by clients of the query engine (e.g., users or services). Accordingly, in some embodiments, if the match score for a subject index entry exceeds a defined threshold value, the associated subject index entries may be considered to be relevant to the question. Also, in some embodiments, question match models may be configured to score different portions (sections) of subject index entries such that each portion may be associated with a partial match score that may be combined to produce a total match score for each subject index entry.

In one or more of the various embodiments, query agents, such as query agents 418 may be arranged to employ the matched subject index entries to generate queries that may be submitted directly to the content systems that may be associated with the relevant subject index entries. In some embodiments, query engines may adapt particular query agents to a particular question by generating one or more prompts that may be provided to generative artificial intelligence systems or large language models. In some embodiments, these prompts may include context information from the matched subject index entries that may be used to train the generative artificial intelligence to enable the generative artificial intelligence to generate a specialized query or queries that may be executed against the content systems. For example, in some embodiments, a matched subject index entry may declare that the content system of interest for a question is a security information and event management system. Accordingly, in this example, the query agents may generate a prompt that asks the generative artificial intelligence to generate a formal query (e.g., in the query language of the target content system) based on the subject index entry and the question. Thus, in some embodiments, if the generative artificial intelligence provides the query, the query agent may submit the query to the content system. In some cases, for some embodiments, this submission may result in a raw result set generated by the content system. In this example, for some embodiments queries/responses 426 represents the machine generated queries that may be submitted to content systems and the responses to those queries.

In some cases, in some embodiments, the query agent (or another query agent) may receive the raw result set and generate additional prompts directed to determining if the raw responses include an answer to the question. Accordingly, in some embodiments, if the responses from the content systems include information sufficient to form an answer, query models may provide the answer to the question. In some cases, the answer may be a natural language answer to the initial question. Also, in some embodiments, query agents may be configured to employ model prompts that train the query models to provide answers in a structured format in the form of JSON, XML, or the like. Accordingly, in some embodiments, answers, such as answer 424 may be provided to the clients that provided the questions associated with the answers.

Figure 5:
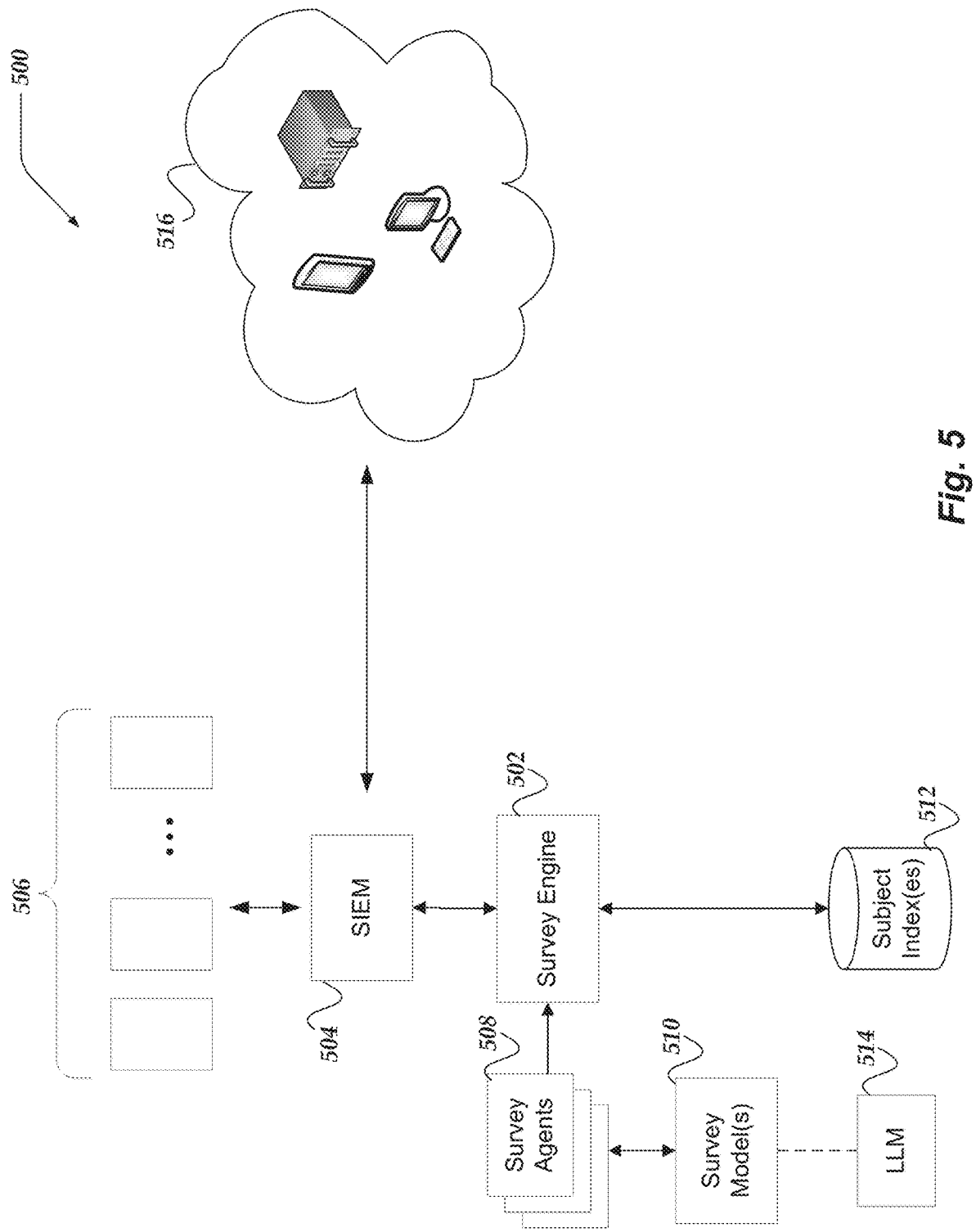
FIG. 5 illustrates a logical schematic of a system for systems for surveying security environments in accordance with one or more of the various embodiments.

FIG. 5 illustrates a logical schematic of system 500 for systems for surveying security environments in accordance with one or more of the various embodiments. As described generally above, in some embodiments, survey engines, such as survey engine 502 may be directed to examine or analyze security information and event management systems (SIEMs) and the information stored or generated by these systems. For example, in this example, survey engine 502 may be configured to execute actions to survey security information and event management system (SIEM) 504. In some embodiments, surveying a SIEM may include examining the data stores used by the SIEM. In this example, for some embodiments, tables 506 may be considered to be data stores for SIEM 504. Accordingly, in some embodiments, survey engine 502 may be arranged to evaluate the configuration or contents of tables 506. In some embodiments, survey engines may be arranged to generate summary information (e.g., subject index entries) that summarizes or characterizes the type of information that may be stored in individual SIEM tables. Also, in some embodiments, this summary information may include examples of queries that may be answered from particular tables used with the SIEM.

Accordingly, in some embodiments, SIEMs, such as SIEM 504 may monitor activity associated with networking environments, such as network environment 516. Accordingly, SIEMs may populate tables 506 with events, metrics, log records, or the like, that may be associated with activity occurring in network environment 516. For example, in some embodiments, SIEMs may be configured to track/monitor user logons, application activity, access to sensitive assets, performance metrics, data infiltration, data exfiltration, or the like. In most cases, SIEMs may be configured by operators to accommodate local requirements or local circumstances. Accordingly, in some cases, the same type of SIEM may be configured differently for different installations within the same or different organization.

In one or more of the various embodiments, survey agents, such as survey agents 508 may be employed by survey engines to interrogate or otherwise discover configuration characteristics for one or more SIEMs. In some embodiments, different organizations may employ different types of SIEMs. Also, in some cases, two or more different SIEMs may be employed within the same organization. Accordingly, in some embodiments, different survey agents may be configured or tuned for different types of SIEMs. In some embodiments, survey agents may be configured to use APIs or interfaces provided by the SIEMs to examine the characteristics of the different SIEMs. Further, in some embodiments, survey agents may be arranged to employ SIEM APIs or SIEM interfaces to extract data samples from the SIEM data sources (e.g., tables).

In some embodiments, SIEMs may be configured to employ conventional data sources (e.g., third-party databases) that may be accessed using APIs or interfaces provided by the data sources rather than using SIEM provided APIs or interfaces.

In one or more of the various embodiments, survey agents, such as survey agents 508 may be arranged to employ one or more survey models, such as survey models 510 for examining or characterizing SIEM tables or SIEM data. In some embodiments, survey models, such as survey models 510 may represent data structures, machine learning models, filters, NLP models, or the like that may be configured for characterizing SIEM tables or SIEM data.

In some embodiments, survey models, such as survey models 510 may include or reference generative artificial intelligence models, such as large language model 514. Accordingly, in some embodiments, survey agents may be configured to submit prompts to large language models, or the like, as part of the interrogation process or for generating subject index entries.

In some embodiments, survey engines may be arranged to generate one or more subject index entries for various table or data stores that may be used or included with SIEMs. In some embodiments, subject index entries may be generated for each table in a SIEM. Also, in some embodiments, subject index entries may be generated for policy types, concepts or logical modules presented by SIEMs rather than just being generated for tables. For example, in some embodiments, a SIEM may logically organize information into events, records, custom metrics, or the like, without using separate of distinct tables for each type of information. Thus, in some embodiments, survey engines may be configured to generate subject index entries that may be associated with logical objects or logical data types rather than being restricted to generating subject index entries for actual tables. For example, if a SIEM stores events and log records in the same table, survey engines may be configured to generate separate subject index entries for event records and separate subject index entries for log records even though the two data types are stored in the same SIEM table.

In some embodiments, tables 506 may be considered to represent data stores used by the SIEMs for storing SIEM information. In some embodiments, SIEMs may be configured to use a single table for storing different types of information. Also, in some embodiments, SIEMs may be configured to use databases, log files, event repositories, metric counters, or the like, or combination thereof for storing SIEM information. However, for brevity or clarity, the various types of data storage objects used for storing SIEM information may be referred to herein as tables.

Figure 6:
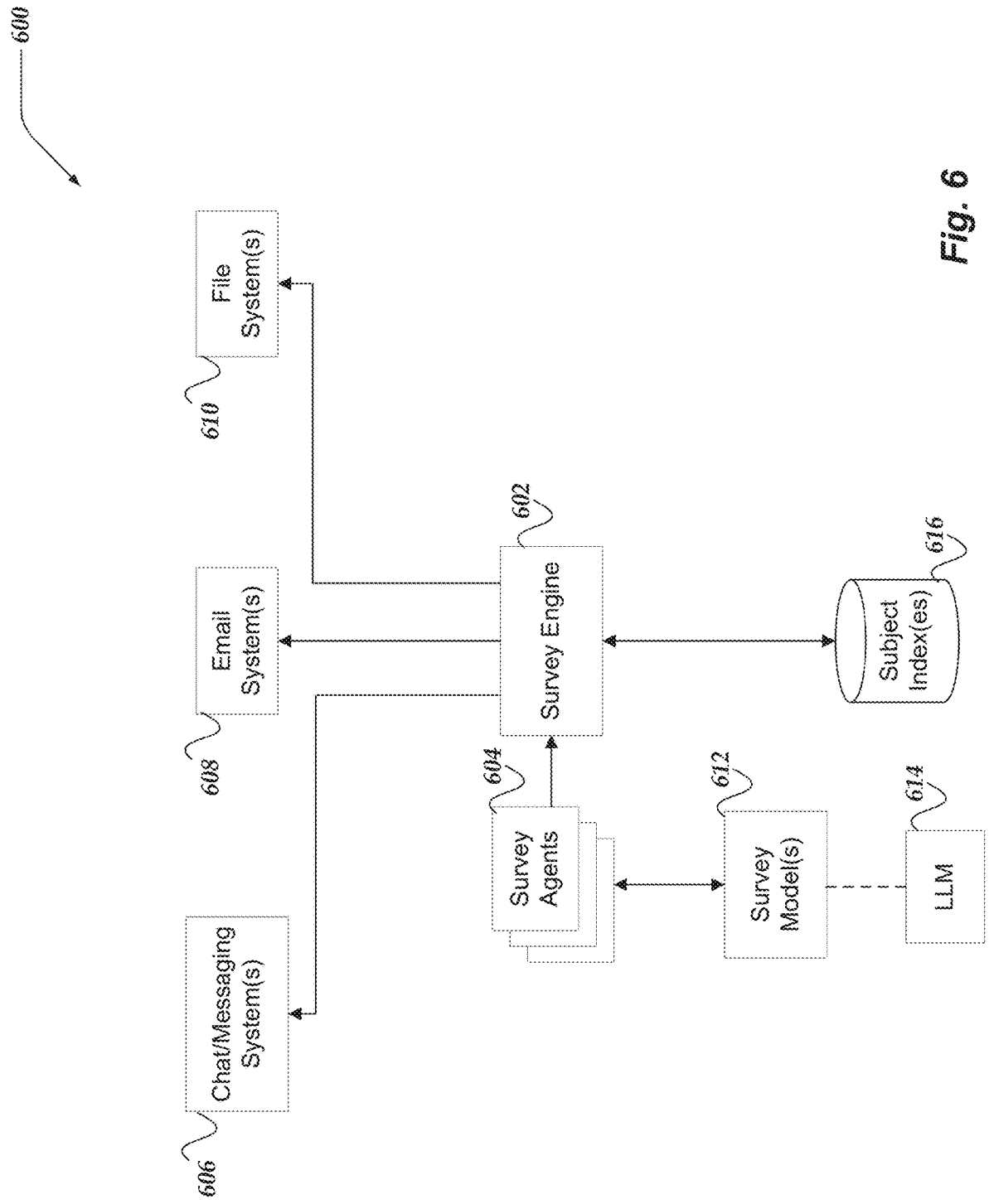
FIG. 6 illustrates a logical schematic of a system for systems for surveying security environments security information in accordance with one or more of the various embodiments.

FIG. 6 illustrates a logical schematic of system 600 for systems for surveying security environments security information in accordance with one or more of the various embodiments. In some cases, organizations may employ various messaging or communication systems/services used for internal communication. In some cases, communications or digital conversations between employees may directly or indirectly enunciate security policy information of an organization. In some cases, this type of policy information may be in addition to formal/official policy publications. Also, in some embodiments, policy information embedded in messaging content may be in conflict with official documented policies. For example, a formal policy may require users requesting access a resource be approved manually. Accordingly, in some embodiments, a messaging system may be used to communicate requests for access or access approvals. Accordingly, in some embodiments, a review of responses to access requests may indicate additional unwritten policies that may be active in an organization. For example, if all requests for access to a particular resource by particular users are always approved while others may be rejected, it may be inferred that there may be an unpublished policy that the particular users may be eligible to access the resource while others may be considered ineligible.

Accordingly, in some embodiments, survey engines, such as survey engine 602 may be arranged to scan messaging systems such as chat/messaging systems 606, email systems 608, file systems 610, or the like, for an organization to identify implicit or otherwise hidden policies enforced or applied by organizations.

In some embodiments, survey engines may be arranged to employ one or more survey agents, such as survey agents 604 for performing the particular actions for examining one or more messaging systems. In some embodiments, one or more survey agents may be arranged to employ various APIs or interfaces provided by messaging systems to examine the contents or metadata associated with or stored within messaging systems. For example, in some embodiments, a survey agent may be configured to access an email system to enable policy associated communications to be determined or evaluated. Similarly, in some embodiments, if an organization employs a messaging system that enables employees to communicate in real-time, survey agents may be arranged to scan those messages using APIs or interfaces provided by the messaging system. In some embodiments, organizations may employ more than one messaging system (e.g., different departments may use different messaging systems). Accordingly, in some embodiments, a survey engine may be configured to employ one or more survey agents, such as survey agents 604 that may be directed/configured for one or more different types of messaging systems.

In some embodiments, survey models, such as survey models 612 may be arranged to provide analysis support or decision support for survey agents. In some embodiments, survey models may be configured to include one or more filters, classifiers, pattern matching, natural language processing (NLP), or the like, for evaluating messaging content or messaging information that may be collected by survey engines. For example, a survey engine or survey agent may collect several messages from a messaging system, a survey model may be configured to group the messages into categories based on various criteria, such as policy trigger phrases, user roles, requests for access, denial of requests, or the like. Also, in some embodiments, survey models may be trained or configured to group of categorize messages based on meta-data, subject lines, titles, time-of-message, source or message, or the like. Accordingly, in some embodiments, survey models may be employed to group messages into conversations based on subject, participants, time windows, or the like. Also, in some embodiments, some messaging systems may include inherent threading features that may used to determine if two or messages may be part of the same conversation. Accordingly, in some embodiments, associated survey models or survey agents may be configured to group messages according to how they may be associated by a messaging systems threading facility.

In some embodiments, survey agents may be arranged to employ survey models to characterize messages or message participants. For example, if one or more users may be the target for request-to-access messages, those users may be characterized as administrators or supervisors with authority to respond to access requests. Thus, in some embodiments, evaluating the contents of messages or patterns of messages may enable survey engines to determine authorizing users in the absence of their membership in particular administrative groups or associated with administrative user roles.

In some embodiments, survey models may include or reference generative artificial intelligence systems such as large language model 614. Accordingly, in some embodiments, survey agents may employ survey models employ large language models for evaluating messages.

Similar to surveying SIEMs discussed above, survey engines may be arranged to generate subject index entries for various messages or message conversations. Also, in some embodiments, subject index entries may be generated for particular policies for policy subjects. For example, a subject index entry for server access policy may include a summary of policies inferred from surveying messages in messaging systems. Accordingly, in some embodiments, subject index entries based on surveying messaging systems may be stored in subject indexes, such as subject index 616.

Figure 7:
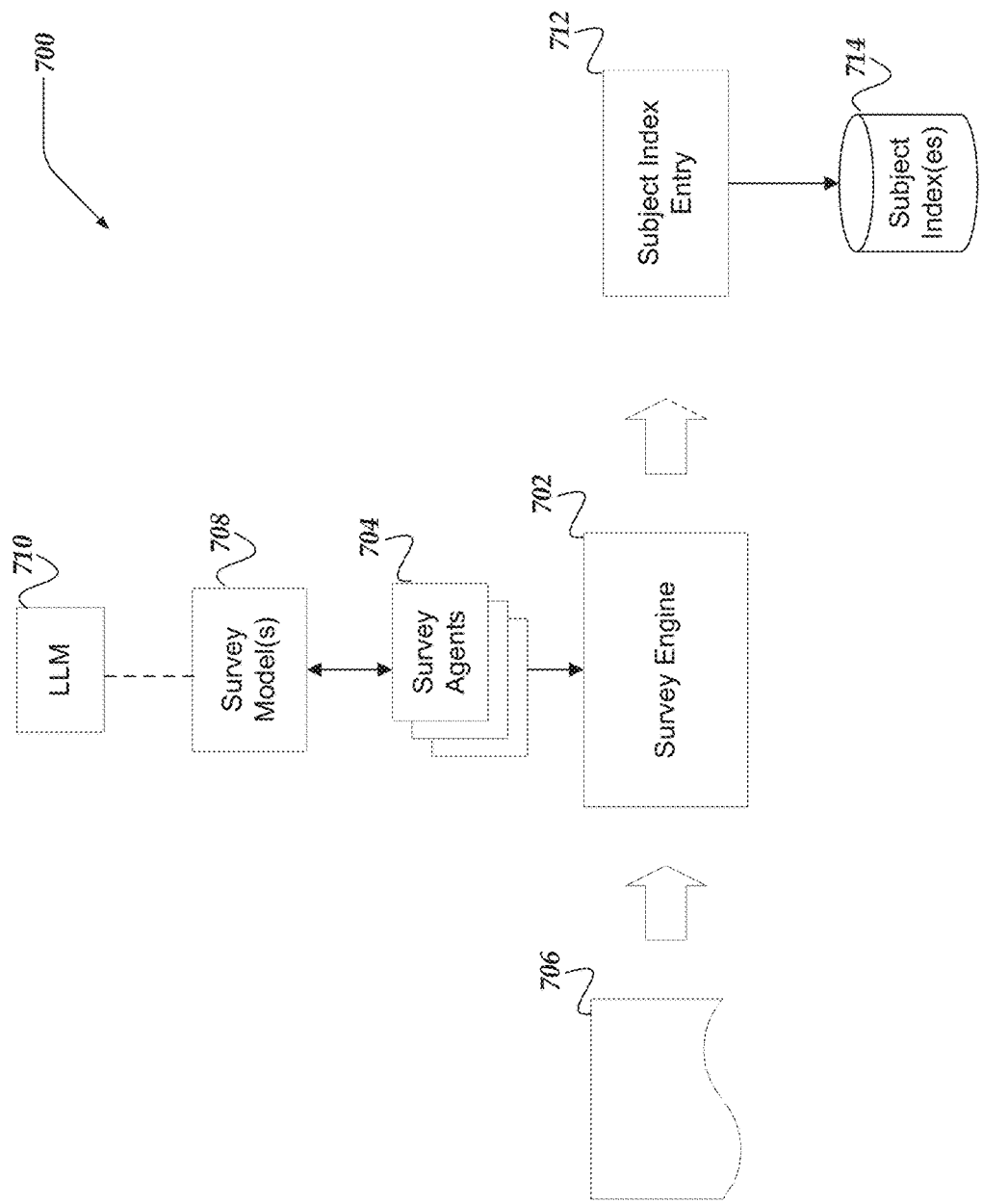
FIG. 7 illustrates a logical schematic of a system for systems for surveying security environments in accordance with one or more of the various embodiments.

FIG. 7 illustrates a logical schematic of system 700 for systems for surveying security environments in accordance with one or more of the various embodiments.

In some embodiments, systems, such as system 700 may include: one or more survey engines, such as survey engine 702; one or more survey agents, such as survey agents 704; one or more survey models, such as survey models 708; one or more large language models, such as large language model 710; or the like.

In some embodiments, content such as data tables, documents, message collections, email collections, or the like, may be collected for submission to survey engine 702. Accordingly, in some embodiments, survey engines may employ one or more survey agents to investigate content 706. Further, in some embodiments, survey engines may employ survey agents that may be configured to access various content information sources, tables, or data sources. In some embodiments, survey agents may be configured to use particular APIs, interfaces, work-flows, or the like, for collecting information from various data/information sources, including SIEMs or messaging systems.

In some embodiments, different survey agents may be directed to different types of content information systems. Also, in some embodiments, one or more survey agents may be configured to characterize or classify content. In some embodiments, such characterization or classification actions may include submitting content information to survey models such as survey model 708.

In some embodiments, survey models may be data structures that include filters, machine learning models, heuristics, pattern matching code (e.g., regular expressions), NLP, or the like, for characterizing or classifying content. In some embodiments, survey models may be arranged to interface with one or more generative artificial intelligence systems such as large language model 710. Accordingly, in some embodiments, some survey models may be configured employ APIs or interfaces of large language models. For example, in some embodiments, survey models may be configured to validate if generated large language model prompts conform to the requirements for particular large language models. Likewise, in some embodiments, survey models may be configured to provide a common interface that enables support for more than one large language model or machine learning model. Accordingly, in some embodiments, survey models with different or distinct internals may be substituted in system 700 absent changes to survey agents, or the like.

In some embodiments, large language model 710 (e.g., generative artificial intelligence systems) may be provided by third-party or otherwise external services. Accordingly, in some embodiments, access to large language model 710, or the like, may be provided via APIs or interfaces. However, in some cases, for some embodiments, large language models may be local to an organization. For example, in some embodiments, an organization may employ large language models that are tuned or customized for examining their local content information rather than (or in addition to) employing general purpose large language models.

In some embodiments, survey engines may be arranged to employ survey agents, survey models, large language models, or the like, to generate subject index entries, such as subject index entry 712 for surveyed content information, tables, or data sources. In some embodiments, subject index entries may include summaries, meta-data, structure information (e.g., row/column information), or the like. In some embodiments, one or more survey agents may be directed to generate different portions of subject index entries. Also, in some embodiments, rather than separate survey agents, survey agents may be configured to include one or more sub-agents (not shown) that may be directed to different portions of the subject index entries. For example, a sub-agent may be configured to examine individual table columns to infer data types or data usage information for a data table. Likewise, for example, another sub-agent may be directed to extracting meta-data/header information from email messages.

Accordingly, in some embodiments, survey engines may be arranged to generate a subject index, such as subject index 714 that includes the subject index entries associated with the surveyed content systems. In some embodiments, query engines may be arranged to employ subject indexes to determine answers to queries provided by users or other services.

Figure 8:
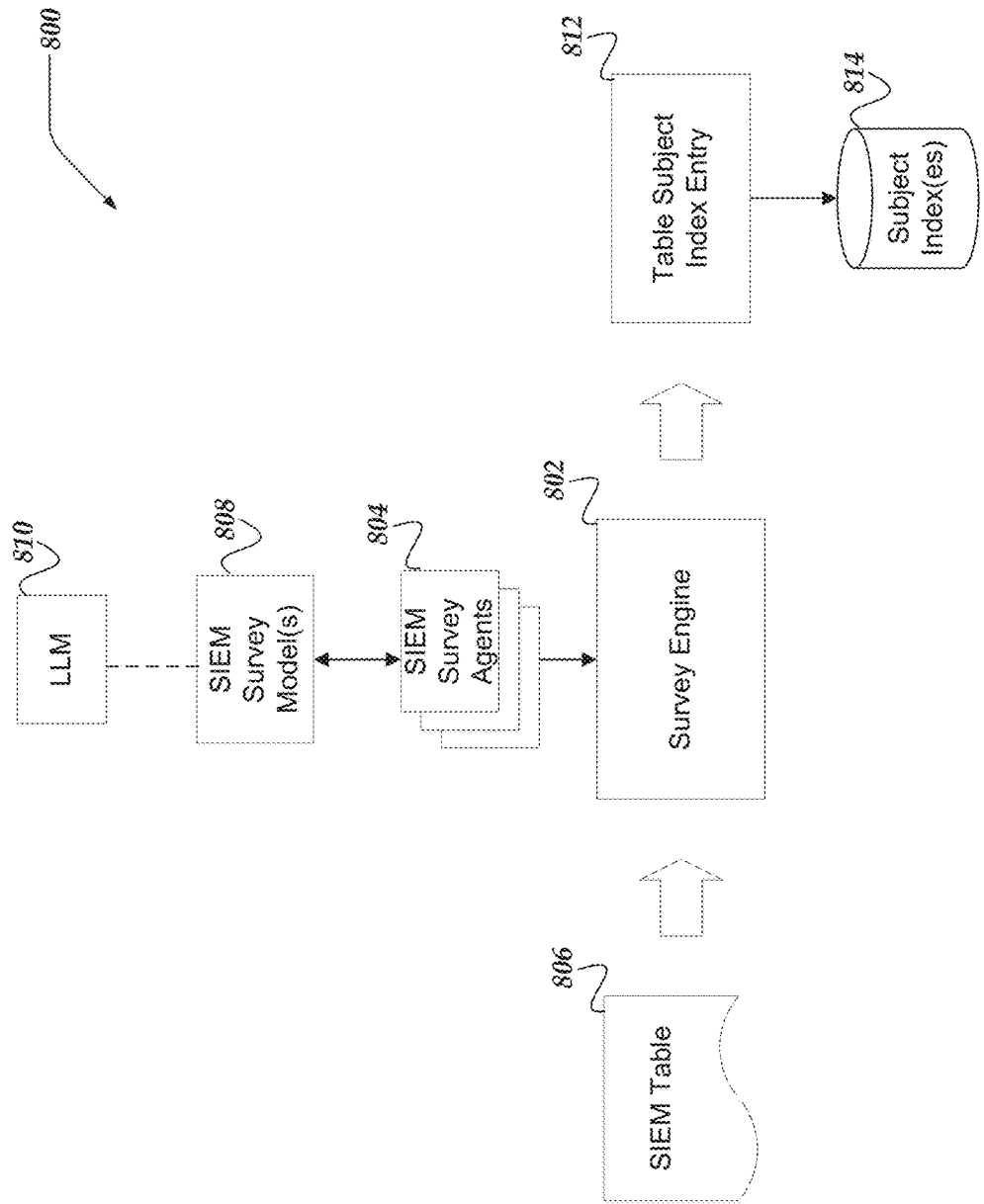
FIG. 8 illustrates a logical schematic of a system for systems for surveying security environments that include SIEMs.

FIG. 8 illustrates a logical schematic of system 800 for systems for surveying security environments that include SIEMs. Note, in some embodiments, system 800 may be considered similar to system 700 described above. In some cases, a system such as system 700 may be employed for surveying SIEMs. For brevity or clarity, system 800 is presented here as a separate embodiment. However, the discussion of some features described above for system 700 may be omitted here for brevity or clarity.

In this example, survey engine 802 may be arranged to employ one or more SIEM survey agents, such as SIEM survey agents 804 to scan data sources associated with SIEMs. Also, in some embodiments, survey engine 804 may be arranged to employ SIEM survey models, such as SIEM survey models 808. As described above, survey models, including SIEM survey models 808 may be configured to employ generative artificial intelligence systems such as large language model 810 for analysis of SIEM information.

Accordingly, in some embodiments, SIEM tables, such as SIEM table 806 may be processed by survey engine 802 to generate subject index entries, such as SIEM subject index entry 812 that may be associated with one or more SIEM tables. In some embodiments, survey engines may be arranged to store SIEM subject index entries in subject indexes, such as subject index 814.

Figure 9:
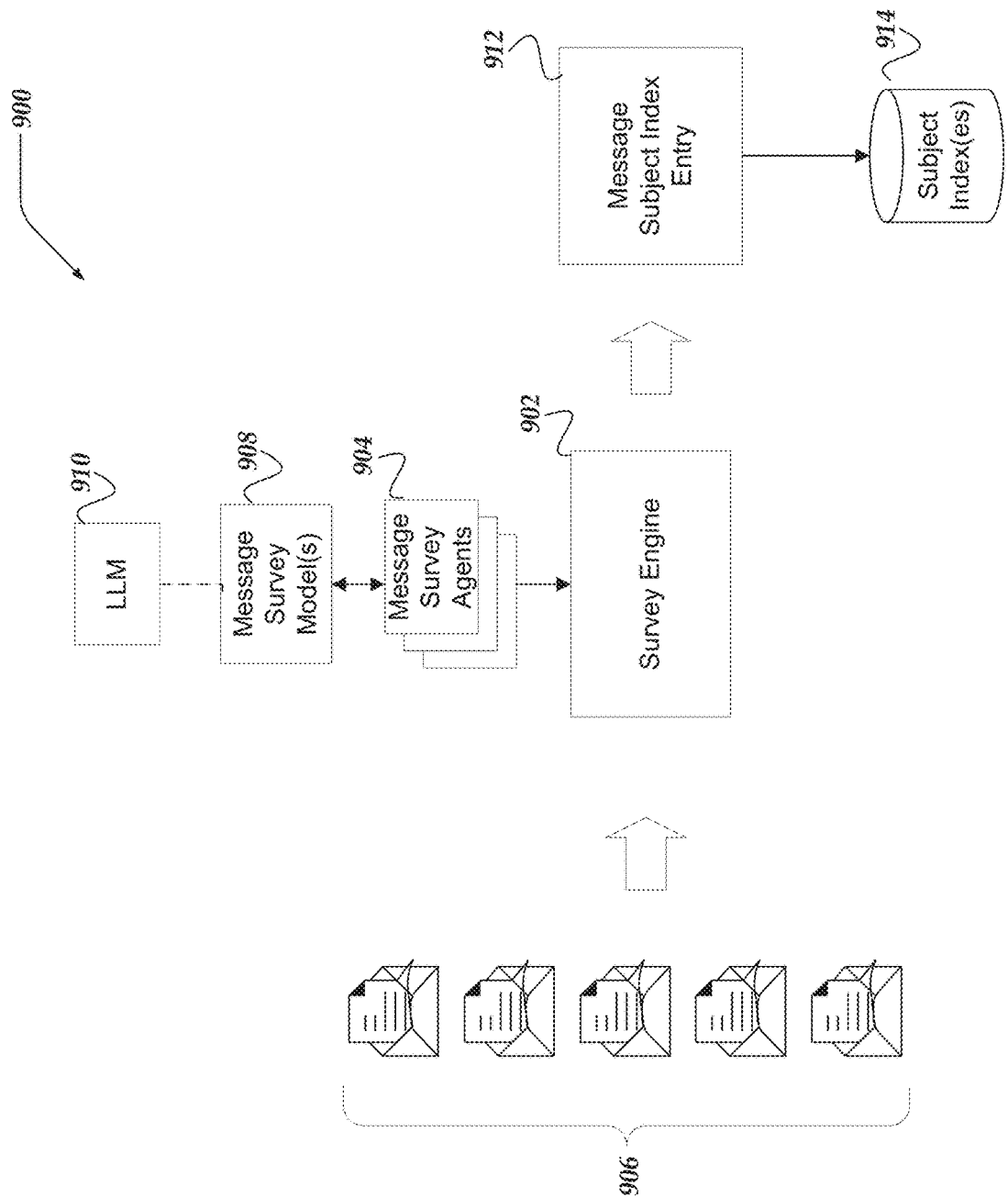
FIG. 9 illustrates a logical schematic of a system for systems for surveying security environments related to surveying messaging systems or communication systems.

FIG. 9 illustrates a logical schematic of system 900 for systems for surveying security environments related to surveying messaging systems or communication systems. Note, in some embodiments, system 900 may be considered similar to system 700 described above. In some cases, a system such as system 700 may be employed for surveying contents associated with or generated by messaging systems, such as email systems, real-time chat, software development project management systems (e.g., bug reports, feature requests, issue resolution reports, or the like), general purpose project managements systems, trouble-ticketing systems, or the like. For at least brevity or clarity, system 900 is presented here as a separate embodiment. However, the discussion of some features described above for system 700 may be omitted here for brevity or clarity.

In this example, for some embodiments, survey engine 902 may be arranged to employ one or more message survey agents, such as message survey agents 904 to scan message data sources (not shown), such as message folders, message archives, message repositories, or the like, that may be associated with messaging systems. Also, in some embodiments, survey engine 904 may be arranged to employ message survey models, such as message survey models 908. As described above, survey models, including message survey models 908 may be configured to determine various features or characteristics of messages or message collections. In some cases, for some embodiments, message survey models may be configured to interface with one or more generative artificial intelligence systems such as large language model 910 for analysis of message information.

Accordingly, in some embodiments, message collections, such as messages 906 may be processed by survey engine 902 to generate subject index entries, such as, subject index entry 912 that may be associated with one or more messages.

In this example, for some embodiments, subject index entry 912 may represent the data structures for storing message associated subject index entries in a subject index, such as subject index 914. In some embodiments, message subject index entries may be based on related messages that may be determined in a same or similar conversations. Also, in some embodiments, survey engines may be configured to associate collections of messages based on the concepts or subject of messages. Accordingly, for example, in some embodiments, collections of messages exchanged among two or more persons may be summarized or analyzed for relevance to organizational or security policies. Also, for example, in some embodiments, messages may be categorized based on shared concepts, date-time, as well as participants. For example, in some embodiments, systems for surveying security environments may be arranged to include one or more ontologies or dictionaries of subjects, concepts, policies, or the like, that subject index entries may be associated with.

Figure 10:
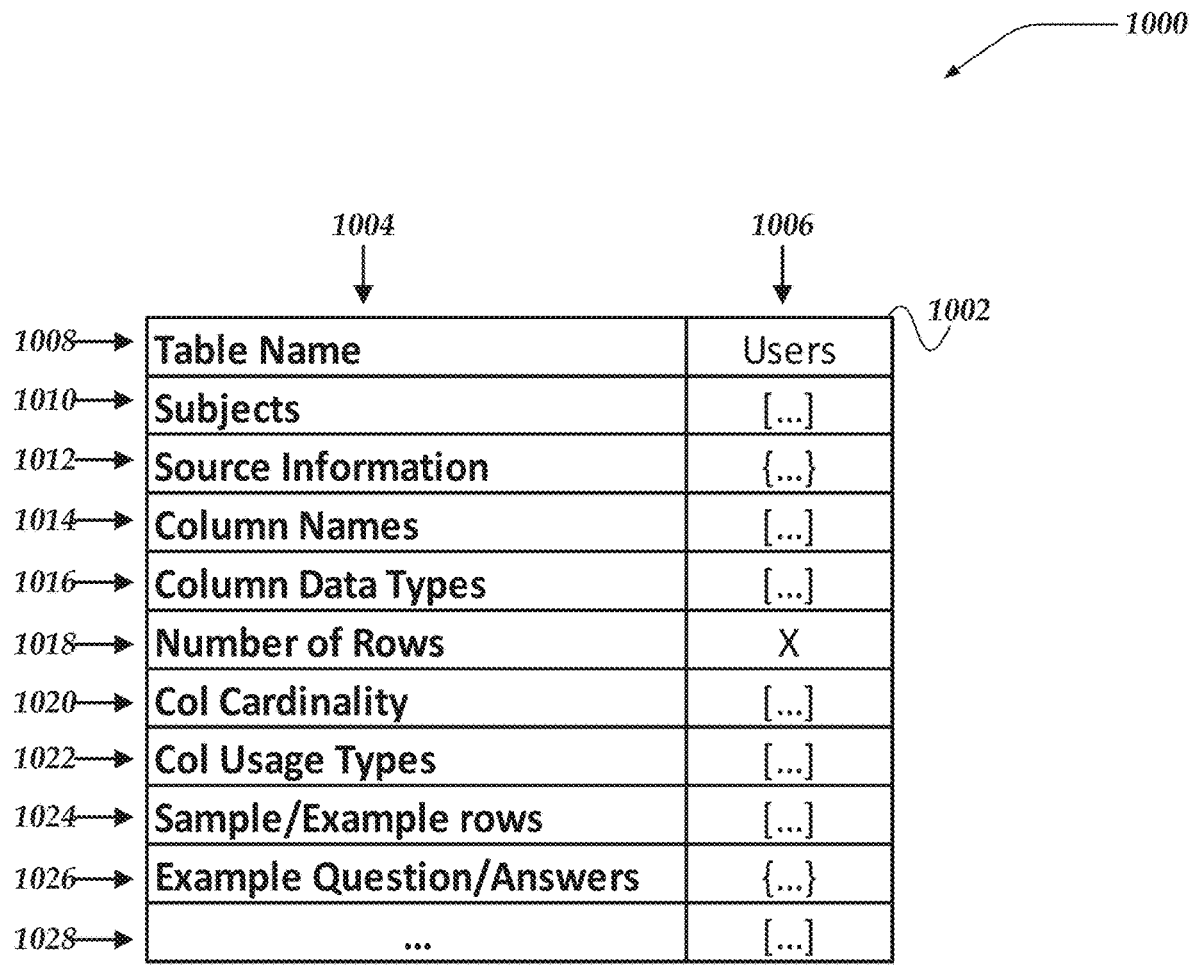
FIG. 10 illustrates a logical schematic of a subject index entry for systems for surveying security environments in accordance with one or more of the various embodiments.

FIG. 10 illustrates a logical schematic of subject index entry 1000 for systems for surveying security environments in accordance with one or more of the various embodiments. As descried above, in some embodiments, survey engines may be arranged to generate subject index entries for various surveyed data sources. In some cases, for some embodiments, data sources may be tables (or the like) that SIEMs may employ for storing information that the SIEMs may collect about activity in a computing environment.

Accordingly, in some embodiments, survey engines may be arranged to evaluate SIEMs data sources to examine or characterize various tables used by the SIEMs. In some embodiments, survey engines may be arranged to employ different survey agents that may be directed to different types of SIEMs. In some cases, SIEMs may expose APIs or interfaces that survey engines may employ to access information about their data sources. Alternatively, in some cases, an underlying conventional database may be employed by SIEMs to store security information, events, log records, or the like. In such cases, for some embodiments, survey engines or survey agents may employ APIs or interfaces provided by the underlying database to access the tables or data generated by SIEMs.

In some embodiments, survey engines may be arranged to employ one or more survey agents that may be configured to execute one or more survey actions to collect or infer information about the SIEMs table. In some embodiments, survey engines may be arranged to generate subject index entries that include the information about the various tables discovered during surveys.

In some embodiments, the particular information stored in subject index entries may vary depending on the type of information being collected by the SIEM. Likewise, the contents of subject index entries may vary depending on type or structure of the data sources used by the SIEMs. For example, in some embodiments, in some cases SIEMs may store information using tables with columns and rows while in other cases, SIEMs may store information with less structure using log files, or the like. Accordingly, in some embodiments, survey engines may be arranged to include different information in subject index entries for different data source formats/facilities. For example, if a SIEM does not employ tables or table-like data sources, associated subject index entries may omit information about columns types, or the like.

In this example, for some embodiments, subject index entry 1000 is represented by data structure 1002. Accordingly, in this example, column 1004 stores the field names for various fields of a subject index entry; column 1006 stores that values corresponding to a field; or the like.

In some embodiments, data structures, such as data structure 1002 may include various fields. In some embodiments, field 1008 may store a name of the table. This may be a name provided by the SIEM or a name generated by the survey engine if the SIEM does not provide a suitable naming table scheme. In some embodiments, field 1010 may store a list or collection of subjects or concepts that may be associated with the table. In some embodiments, field 1012 may store information about where the original table may be located. This information may be used to enable users to review the data corresponding to the subject index entry directly. In some embodiments, field 1014 may store a list of column names. In some embodiments, field 1016 may store a list of data types that may be associated with the columns. In some embodiments, field 1018 may store a count of the number of rows in the table. In some embodiments, field 1020 may store column cardinality indicating the cardinality of each column. In some embodiments, field 1022 may store information such as column usage type. For example, this information may indicate if a string column is storing mailing addresses, user names, email address, or the like. Likewise, in some embodiments, this field may indicate if columns storing numeric values are storing aggregates, categories, index/serial numbers, time stamps, sequence numbers, or the like. In some embodiments, field 1024 may store a collection of complete (or abbreviated) rows from the original table. In some embodiments, field 1026 may store one or more example question/answer pairs that this table may provide relevant answers for.

Note, in some embodiments, as discussed, different subject index entries may have different fields depending on what they represent. In some cases, in some embodiments, some fields may be omitted or included based on local requirements or local circumstances. Accordingly, in some embodiments, survey engines may be arranged to determine the particular formatting or fields for subject index entries based on rules, templates, or the like, provided via configuration information to account for the local circumstances or the local requirements. Note, in this example, field 1028 represents additional fields that may be included in subject index entries depending on the local requirements or the local circumstances, if any.

Further, in some embodiments, while data structure 1002 is illustrated here as a table or table-like data structure, one of ordinary skill in the art will appreciate the other data structures or data formats may be employed without departing from the scope of the innovations described herein.

Figure 11:
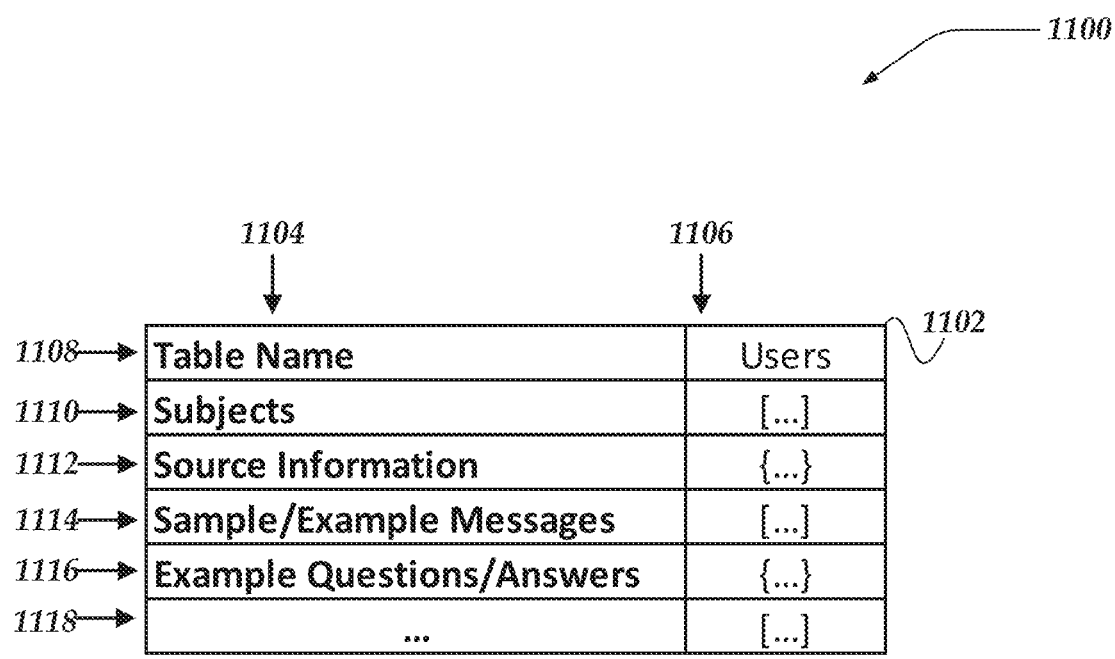
FIG. 11 illustrates a logical schematic of a subject index entry for systems for surveying security environments in accordance with one or more of the various embodiments.

FIG. 11 illustrates a logical schematic of subject index entry 1100 for systems for surveying security environments in accordance with one or more of the various embodiments. As described above, in some embodiments, survey engines may generate subject index entries for various surveyed content sources. In some cases, for some embodiments, content sources may include messaging systems, or the like. Accordingly, in some embodiments, survey engines may be arranged to be associated one or more messages into conversations based on one or more of the subject of conversation, participants, policies, concepts, or the like. Thus, in some embodiments, survey engines may be arranged to generate subject index entries that represent one or more messages. Also, in some embodiments, survey engines may be arranged to provide ontologies or dictionaries of policy concepts or policy subjects that messages may be associated with. Accordingly, in some embodiments, survey engines may be arranged to generate subject index entries for the different concepts/subjects.

In some embodiments, survey engines or survey agents may be arranged to execute one or more NLP operations to group or associate messages into conversations. For example, in some embodiments, messages may be grouped by subject lines, participants, content, time, or the like, or combination thereof. In some embodiments, one or more messages may be associated with more than one subject index entry. For example, in some embodiments, survey engines may determine that a message is relevant to two or more concepts or policies.

Accordingly, in some embodiments, subject index entries associated with messages or messaging content may include various fields that enable query engines to identify subject index entries that may be relevant to queries that may be provided by users or services.

In this example, for some embodiments, data structures, such as entry container 1102 may include column 1104 for storing the names of fields, column 1106 for storing values of fields, or the like. For example, in some embodiments, entry containers such as entry container 1102 may include fields such as: field 1108 for storing a name or identifier for the particular subject index entry; field 1110 for storing a collection of subjects or concepts associated with the subject index entry; field 1112 for storing information about the source of the messages that may be associated with a subject index entry; field 1114 for storing one or more sample/example messages that the subject index entry may be based on; field 1116 for storing one or more example question/answer pairs associated with the subject index entry; or the like. Note, in this example, for some embodiments, field 1118 may be considered to represent additional fields that may be included in subject index entries depending on local requirements or local circumstances.

Figure 12:
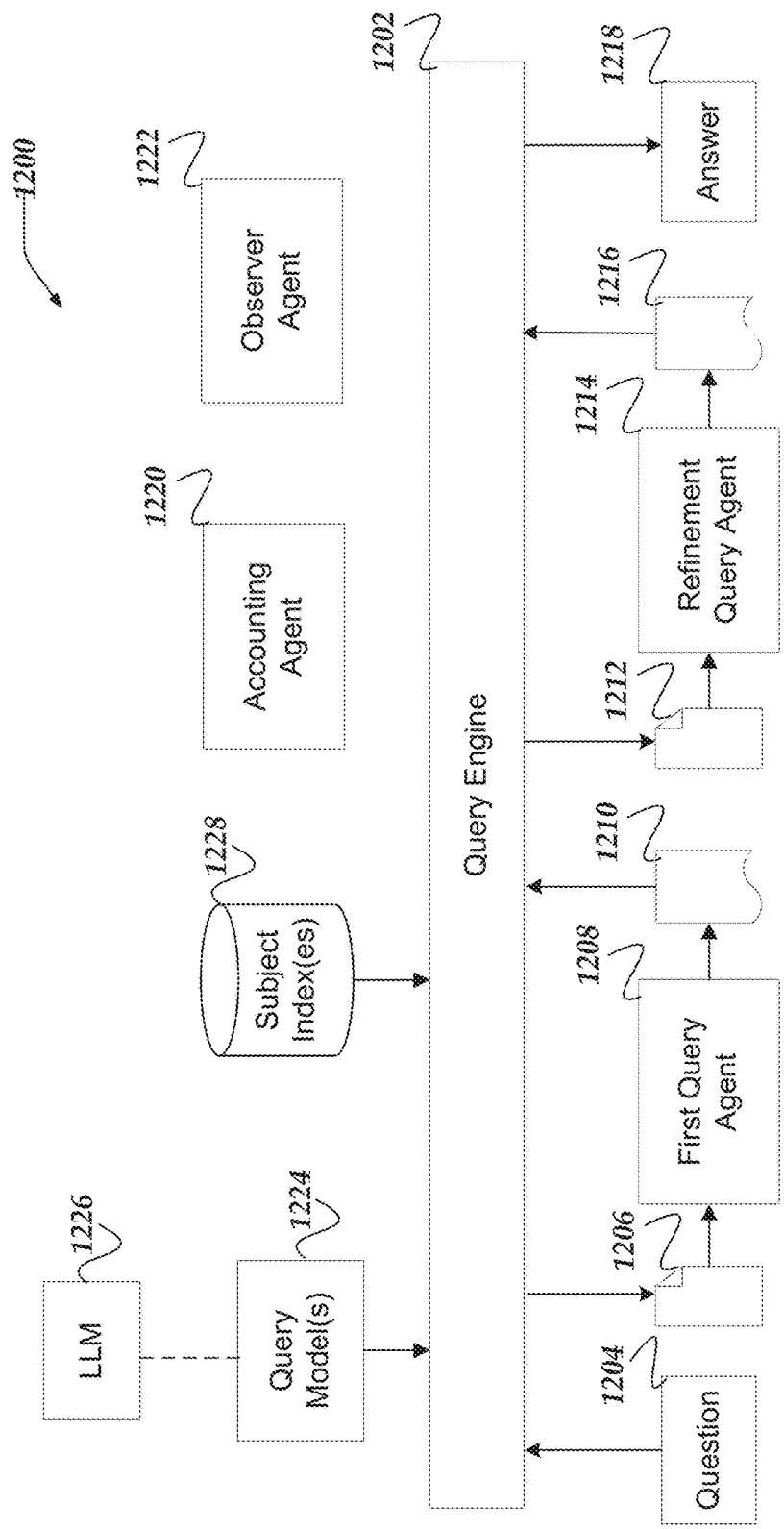
FIG. 12 illustrates a logical schematic of a system for surveying security environments in accordance with one or more of the various embodiments.

FIG. 12 illustrates a logical schematic of system 1200 for surveying security environments in accordance with one or more of the various embodiments. Here, system 1200 represents how queries may be processed using query engines, query agents, query models, or the like.

In one or more of the various embodiments, query engine 1202 may be arranged to be provided question 1204. In some embodiments, query engines may be arranged to provide one or more user interfaces that enable users to enter questions. In some embodiments, questions may be provided as free-form text (e.g., natural language) or using more structured user interface controls (e.g., selection lists, buttons, check-boxes, sliders, or the like) that may be associated with question parameters or question that may be composed into questions. Note, in some embodiments, questions may be natural language free-form text, structured data, semi-structured data, or the like, depending on the user interface used for collecting the questions. In some embodiments, query engines may be arranged to provide APIs or interfaces that enable other services or processes automatically to provide free form or structured questions to query engines. In some embodiments, while not shown here, one of ordinary skill in the art will appreciate that questions may be contained in data structures that associate information, such as, source of question, author of question, date/time information, or the like, with the actual question.

Accordingly, in some embodiments, query engine 1202 may be arranged to generate an initial prompt, such as prompt 1206 that may be provided to first query agent 1208. In some embodiments, query engines may be arranged to modify an initial prompt template (not shown) to include query information associated with question 1204. In some embodiments, the initial prompt may vary depending on the type of question, source of the question, or the like.

In some embodiments, query engines, such as query engine 1202 may be arranged to submit prompts, questions, or the like, to query models, such as, query models 1224, which in turn may employ filters, heuristics, machine learning models, including generative artificial intelligence such as large language model 1226 for generating responses or partial responses for processing questions. For example, in some embodiments, query engines may be arranged to submit the initial question to a query model to determine or generate the initial prompt.

Further, as described above, survey engines may generate one or more subject indexes, such as subject index 1228. Accordingly, in some embodiments, query agents may be configured to employ information from subject index entries for generating prompts or generating answers or partial answers.

In some embodiments, initial prompts may be arranged to train large language models or other generative artificial intelligence systems to generate responses that enable query engines to generate answers to question 1204. Accordingly, in some embodiments, response 1210 may include instructions or other information (e.g., data in particular data structures) that enable query engines (or query agents) to generate one or more refinement prompts, such as refinement prompt 1212. Also, in some embodiments, response 1210 may include instructions for selecting one or more query agents that may correspond with the one or more refinement prompts. For example, an initial prompt may be employed to determine subjects or concepts relevant to a query while to subject or concepts may be employed to identify one or more subject index entries that may include information relevant to providing an answer to the query.

Accordingly, in some embodiments, query engines may be arranged to provide refinement prompt 1212 to refinement query agent 1214. In turn, for some embodiments, refinement query agent 1214 may be arranged to generate refined query response 1216 that includes information associated with the execution of the refinement query agents. In some cases, for some embodiments, refinement responses may include instructions that query engines may execute on-behalf of query agents. Also, in some embodiments, refinement responses may include results of one or more actions executed by the refinement query agent itself rather than being limited to including instructions for performing actions outside of the query agent or large language models.

In some embodiments, query engines may be arranged to provide refinement responses to refinement query agents to determine if the processing of the question has been completed. Accordingly, in some embodiments, if the refinement query agent determines that a question is processed, the refinement query agent may submit query results to the query engine for reporting in a report that includes answers to the question, such as answer 1218.

Also, in some embodiments, if refinement query agents determine that additional question processing may be required, refinement query agents may generate additional query prompts that may be provided to the same or other query agents. Thus, in some embodiments, refinement query agents may iteratively continue to generate query responses or partial responses until it or the query engine determines that the question (e.g., question 1204) has been answered.

In one or more of the various embodiments, one or more accounting agents, such as accounting agent 1220 may be arranged to monitor various resources being used by (or associated with) various agents for processing questions. Thus, in some embodiments, accounting agents may be arranged to report if one or more resources used for processing queries exceed one or more threshold values depending on local requirements or local circumstances. Accordingly, in some embodiments, query engines may be arranged to use information collected by accounting agents to determine how questions may be answered. For example, for some embodiments, query engines may be configured to evaluate a limited number of tables (or other subject index entries) rather than evaluating all tables. Accordingly, for example, a query engine may be configured to adjust the depth or breadth of query processing based on resource consumption. Also, in some embodiments, query engines may be arranged to favor one or more query agents based on one or more metrics determined by accounting agents. For example, in some embodiments, a query agent directed to employing a particular external service may be disfavored or disabled based on various metrics, such as, changes in responsiveness (e.g., latency), error rates, compute costs, API call costs, or the like. Also, in some embodiments, accounting agents may be arranged to track or monitor one or more metrics associated with different questions or question types, data sources, tables, queries, SIEM types, or the like. Also, in some embodiments, accounting agents may be arranged to monitor metrics for particular prompt templates, or the like, such that prompt templates that exceed resource quotas or fall below performance standards may be disfavored or discarded.

Also, in some embodiments, systems for surveying security environments, such as system 1200 may include one or more other agents, such as observer agent 1222, or the like. In some embodiments, observer agents may be considered agents that may be arranged or configured to track one or more features of the system. In some embodiments, observer agent 1222 may be arranged to track how different agents may perform. In some embodiments, observer agent 1222 may be arranged to monitor which agents have success answering questions. Further, in some embodiments, observer agents may be arranged to monitor information or statistics associated with answering questions, such as, question source, question type, number/rate of correct/accepted answers, incorrect/rejected answers, or the like.

Figure 13:
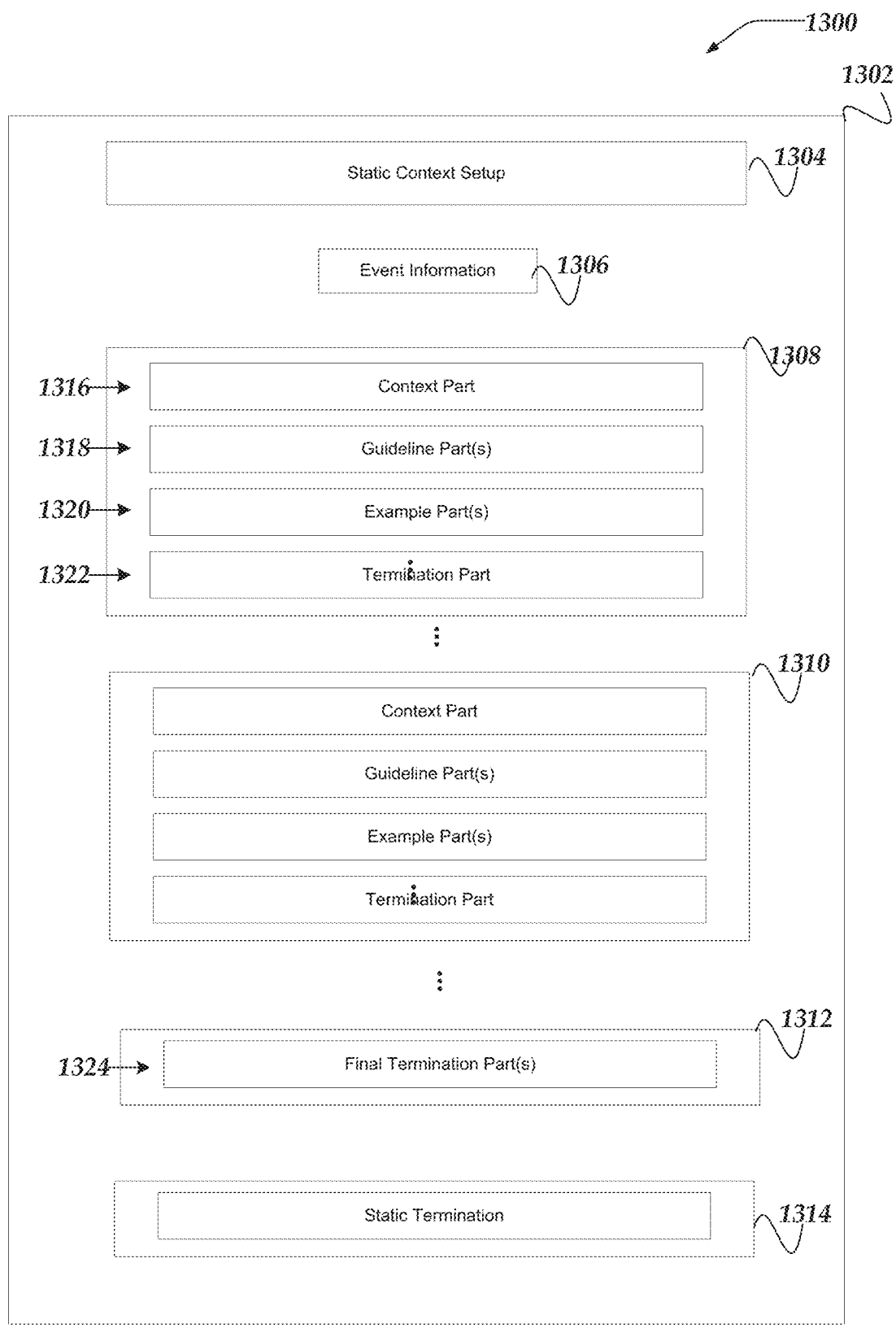
FIG. 13 illustrates a logical schematic of a prompt for surveying security environments in accordance with one or more of the various embodiments.

FIG. 13 illustrates a logical schematic of prompt 1300 for surveying security environments in accordance with one or more of the various embodiments. As described above, survey engines or query engines may be arranged to generate prompts employed by survey agents or query agents.

In one or more of the various embodiments, prompts may be composed of an arbitrary number of prompt fragments. In some cases, for some embodiments, one or more prompt fragments may be considered static fragments since they will be considered a permanent part of a prompt template or prompt framework. Note, different prompt templates (or prompting strategies) may include different static fragments. For example, prompt templates directed to answering particular types of questions or working with particular large language models may have different static prompt fragments from each other.

In one or more of the various embodiments, regular prompt fragments (non-static) may be selected for inclusion in a prompt by survey/query engines. In some embodiments, survey/query engines may be arranged to execute instructions determined from responses to initial prompts or refinement prompts to select prompt fragments to compose prompts for evaluating a particular questions or answers.

In one or more of the various embodiments, prompt fragments may be associated with one or more metrics that may be associated with the use or performance of the prompt fragment. Accordingly, in some embodiments, such metrics may be employed to inform survey engine or query engines in selecting particular prompt fragments for including in a prompt.

Accordingly, in this example, for some embodiments, prompts, such as prompt 1300 may comprise, prompt container 1302. In some embodiments, prompt containers may be data structures that may include or organize prompt fragments, or the like, so they may be provided to a large language model.

In some embodiments, prompt container 1302 may include static context fragment 1304 and static termination fragment. In this example, for some embodiments these static prompt fragment may represent prompt fragments that may be always be included in prompt 1302. In some embodiments, prompt templates may declare one or more static prompt fragments.

Also, in this example, prompt 1302 may include question information 1306 which may represent the information about the questions that is being answered. In some embodiments, question information may include structured information, such as question sources, question target, portions of relevant subject index entries, or the like that are associated with the question being answered. Also, in some embodiments, prompt 1302 may include one or more prompt fragments, such as, prompt fragment 1308, prompt fragment 1310, prompt fragment 1312, or the like.

Also, in some embodiments, each prompt fragment may include one or more prompt fragment parts, such as, fragment part 1316, fragment part 1318, fragment part 1320, fragment part 1322, or the like. In some embodiments, fragment part 1316 may be considered to provide context/setup information relevant to the prompt fragment. Also, in some embodiments, fragment part 1318 may be considered to provide guideline information relevant to the prompt fragment. Guideline information may include instructions that guide the large language model to execute actions for answering questions. For example, actions may include generating or executing queries directed to particular content systems (e.g., SIEMs, messaging systems, or the like) Also, in some embodiments, guideline information may include instructions that set limits, roles, expectations, or the like, for the large language model to apply if generating a response to a prompt. In some embodiments, fragment part 1320 may represent a portion of prompt fragment 1308 that provides one or more examples that a large language model may employ to infer the type of response that is being sought. For examples, relevant subject index entries may include one or more example question and answer pairs that may be included in a prompt fragment, in some embodiments, fragment part 1322 may represent text or tokens that should be applied by the large language model to results associated with the prompt fragment.

In some embodiments, prompts may include a non-static termination prompt fragment, such as, prompt fragment 1312. In some embodiments, non-static termination prompt fragments may include termination prompt fragment parts, such as, fragment part 1324 that may be included selectively in addition to static termination prompt fragment 1314.

In one or more of the various embodiments, query engines or survey engines may be arranged to record historical performance metrics associated with particular prompts, prompt templates, prompt fragments, or the like.

In one or more of the various embodiments, performance metrics may include response latency, response efficacy, query related information (e.g., event type, event source, or the like), time/date information, or the like. Accordingly, in some embodiments, prompt fragments may be selected for inclusion in a prompt based in part by the one or more recorded performance metrics.

Note, one of ordinary skill in the art will appreciate the prompts may include more or fewer prompt fragments each with more or fewer fragment parts than shown here. In some cases, specific prompt templates or individual prompt fragments may be determined experimentally according to local requirements or local circumstances. For example, one or more prompt fragments may be determined by experiment to be effective with a first large language model while other prompt fragments may be determined by experiment to be effective with a second large language model.

Figure 14:
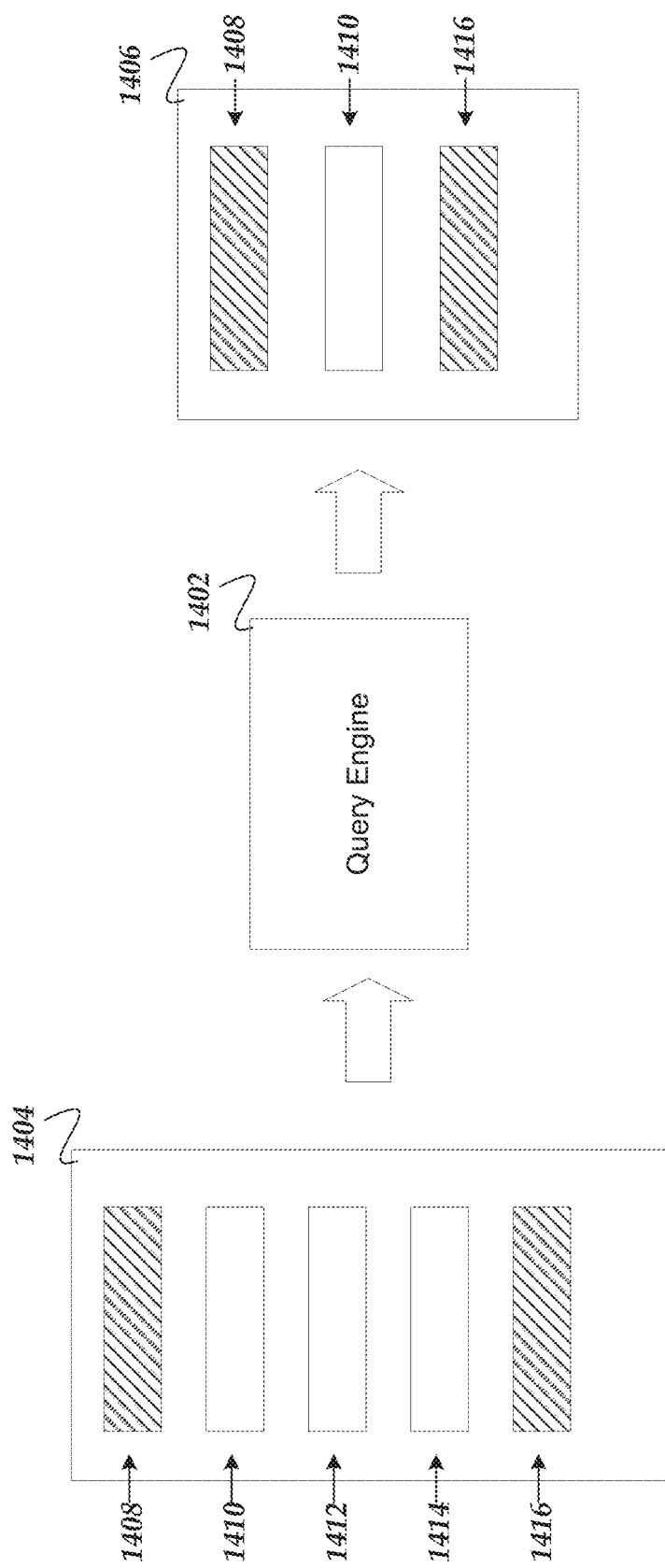
FIG. 14 illustrates a logical schematic of a system for surveying security environments in accordance with one or more of the various embodiments.

FIG. 14 illustrates a logical schematic of system 1400 for surveying security environments in accordance with one or more of the various embodiments. As described herein, survey engines or query engines may be arranged to use training or reinforcement learning methods to generate prompts or prompt templates for surveying actions or processing questions. In this example, prompt 1404 may be considered similar to prompt 1302 described above. Accordingly, in some embodiments, prompt 1404 may include one or more prompt fragments, such as, static prompt fragment 1408, prompt fragment 1414, prompt fragment 1412, prompt fragment 1414, static prompt fragment 1416, or the like.

In some embodiments, survey engines or query engines may be arranged to train prompts by observing which prompt fragments may provide results that may be within one or more constraints or conditions. For example, an initial untrained prompt, such as prompt 1404 may be provided to a large language model such that the large language model's response may be evaluated by a observer agent, evaluation agent, query agent, survey agent, or the like.

In some embodiments, prompts may be configured such that large language model response content associated with individual prompt fragments may be readily identified. In some embodiments, prompt 1404 may be configured such that a large language model will group response content into response fragments that correspond to each prompt fragment. For example, in some embodiments, providing prompt 1404 to a large language model may result in a response that includes response fragments that correspond to prompt fragments in the order they appear in the prompt. Accordingly, in some embodiments, training agents or other observer agents may readily be arranged to compare the performance of different prompt fragments within the prompt.

Accordingly, in some embodiments, prompt fragments that produce useful results may be scored higher than prompt fragments that produce less useful results. In some embodiments, prompt fragments that fall below a threshold score value may be automatically removed from a prompt or prompt template. Likewise, in some embodiments, one or more prompt fragments that may be determined to produce redundant results may be excluded.

Also, in some embodiments, performance metrics associated with each prompt fragment may be considered such that prompt fragments associated with one or more metric values that may indicate relatively poor performance may be identified. For example, in some embodiments, prompt fragments associated with one or more metrics that fall below a threshold value may be removed or excluded from prompts or prompt templates.

In this example, prompt 1406 represents the result of training prompt 1404 such that prompt fragment 1412 and prompt fragment 1414 were removed as a result of training.

In some embodiments, observer agents or evaluation agents (not shown here) may be arranged to monitor how survey agent or query agents may perform. Accordingly, in some embodiments, the associated prompts may be modified or adapted based on real-time performance outside of dedicated training sessions. For example, for some embodiments, if an observer agent determines that a first prompt fragment consistently reports the same answers as a second prompt fragment, the prompt fragment associated with a higher cost (e.g., latency, fees, resources, or the like) may be downgraded such that it may be less likely to be included in prompts.

Figure 15:
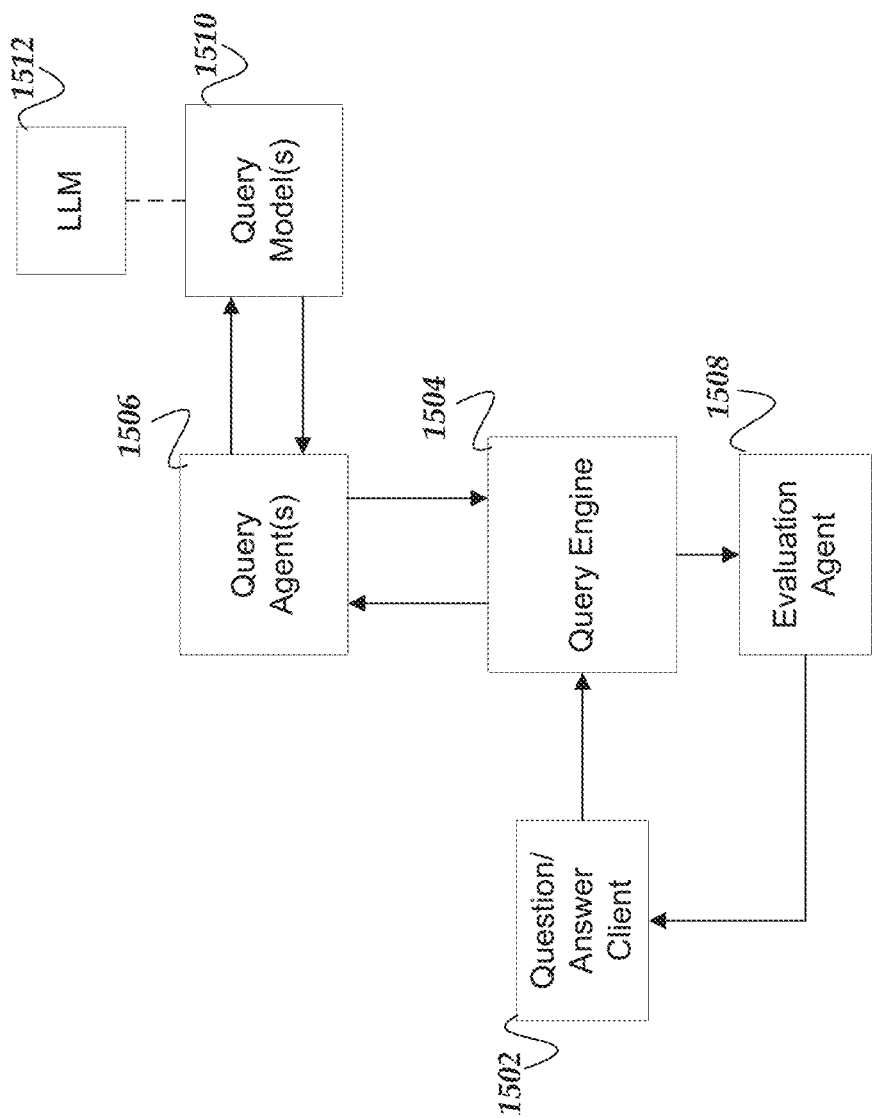
FIG. 15 illustrates a logical schematic for a system for surveying security environments in accordance with one or more of the various embodiments.

FIG. 15 illustrates a logical schematic for system 1500 for surveying security environments in accordance with one or more of the various embodiments. As described above, in some embodiments, client programs or client services associated with query engines may be arranged to provide user interfaces that enable users to provide questions to query engines. In this example, for some embodiments client 1502 may be arranged to provide questions to query engine 1504. Accordingly, in some embodiments, query engine 1504 may be arranged to determine one or more query agents, such as query agent(s) 1506 based on the contents of the question. As described above, in some embodiments, query agents, such as query agents 1506 may employ one or more query models, such as query models 1510. In some embodiments, query models, such as query models 1510 may include or reference generative artificial intelligence, such as large language model 1512. Thus, in some embodiments, query agents may be arranged to generate one or more responses that may be employed to generate one or more answers to the question.

As described, in some embodiments, query engines may be arranged to obtain partial responses from one or more query agents that may be forwarded to subsequent query agents that may be selected based on the contents of the responses. In some embodiments, query engines may be arranged to generate input information based on or that includes responses generated by previously executed query agents. In some embodiments, query engines may be arranged to direct two or more query agents to progressively generate responses based on iteratively or recursively forwarding prompts based on prior responses to one or more query agents. Accordingly, in some embodiments, query engines may be arranged to progressively converge on answers to questions.

In some embodiments, query engines may be arranged to employ query models such that input information, including prompts may be generated by query engines or other query agents. Accordingly, in some embodiments, query agents 1506 may employ or generate one or more prompts (not shown) that may be provided to large language model 1512. In some embodiments, large language models may be trained in real-time by the context information, or the like, included in the prompts to generate response to questions included in the prompts.

In some cases, in some embodiments, query engines may be arranged to employ a query agent (evaluation agent) that is configured to determine that a candidate answer may be ready for returning to the client. For example, a query agent in an evaluation role, such as, evaluation agent 1508 may be configured to evaluate the similarity of responses from different query agents (or based on different prompts) to determine if the query engine has converged on an answer.

For example, in some embodiments, query engines may be configured to employ evaluation agents to compare previous responses to the question with current responses to the questions. Accordingly, if the responses may be within a similarity threshold range the evaluation agent may consider the question to be answered. In contrast, in some embodiments, if the responses from one or more query agents are not determined to be similar, the iterative process of generating updated prompts and resubmitting them to retrain the query models or generative artificial intelligence systems may continue. Note, in some embodiments, query engines may be arranged to have different evaluation agents for different types of questions. Further in some embodiments, query engines may be arranged to adapt to local requirements or local circumstances by enabling organizations to provide customized or configured evaluation agents. For example, in some embodiments, answers for different types of questions may require different types of conditions or evaluations for determining if a query engine has converged on an answer that may be suitable for providing to a client. For example, in some embodiments, if the question asks about particular assets, an evaluation agent may be configured to validate that the users, assets or resources included in the candidate answer actually exist. Thus, in this example, the evaluation agent may guard against generative artificial intelligence hallucinations that may refer to users, assets, or resources that do not exist.

In some embodiments, query engines may be arranged to provide candidate answers to client 1502 such that client 1502 may display the proposed answer to users. In some embodiments, clients may be arranged to provide user interfaces that enable users to grade or score answers. Likewise, in some embodiments, clients may be arranged to enable users to accept or reject answers. Accordingly, in some embodiments, query engines may be arranged to employ the user feedback as part of an iterative process to answer questions. In some embodiments, query engines may be arranged to maintain a contextual session such that users may iteratively provide updates to questions (or new questions) based on partial answers, candidate answers, answers, or the like, provided by query engines.

Generalized Operations

FIGS. 16-23 represent generalized operations for systems for surveying security environments in accordance with one or more of the various embodiments. In one or more of the various embodiments, processes 1600, 1700, 1800, 1900, 2000, 2100, 2200, or 2300 described in conjunction with FIGS. 16-23 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 16-23 may be used for surveying security environments in accordance with at least one of the various embodiments or architectures such as those described in conjunction with FIGS. 1-15. Further, in one or more of the various embodiments, some or all of the actions performed by processes 1600, 1700, 1800, 1900, 2000, 2100, 2200, or 2300 may be executed in part by query engine 322, survey engine 324, survey agents 326, query agents 327, or the like, running on one or more processors of one or more network computers.

Figure 16:
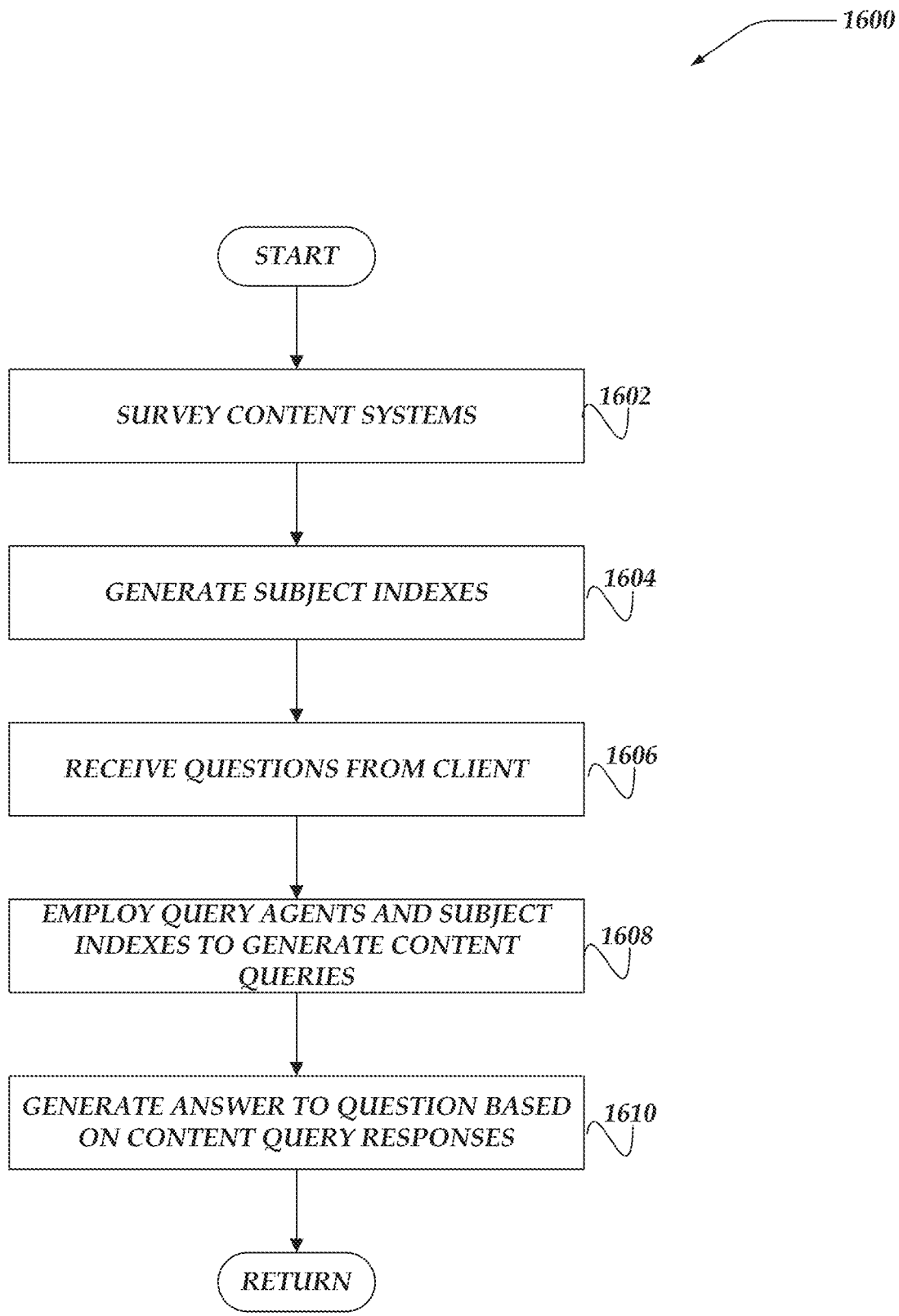
FIG. 16 illustrates an overview flowchart of a process for surveying security environments in accordance with one or more of the various embodiments.

FIG. 16 illustrates an overview flowchart of process 1600 for surveying security environments in accordance with one or more of the various embodiments. After a start block, at block 1602, in one or more of the various embodiments, survey engines may be arranged to survey one or more content systems. As described above, in some embodiments, systems for surveying security environments may be arranged to periodically or continuously monitor one or more content systems for changes or updates to their content or continuation. Accordingly, in some embodiments, survey engines may be arranged to scan data sources associated with content systems, such as security information and event management systems (SIEMs), messaging systems, or the like. As described herein, in some embodiments, survey engines may be arranged to employ one or more survey agents that may be configured to execute one or more actions that enable the content associated with the one or more content systems to be surveyed.

At block 1604, in one or more of the various embodiments, survey engines may be arranged to generate one or more subject indexes based on the surveys. In some embodiments, survey engines may be arranged to generate subject indexes that include one or more subject index entries that store summary information, meta-data, feature characteristics, or the like, associated with various data objects associated with or generated by content systems. In some embodiments, query engines may be arranged to employ information included in subject indexes to determine answers to questions provided by clients of systems for surveying security environments.

At block 1606, in one or more of the various embodiments, query engines may be arranged to be provided one or more questions from one or more clients. In some embodiments, clients, such as users or services may engage with query engines by provided questions. In some embodiments, query engines may be arranged to provide user interfaces that enable users to provide questions as free form natural language or via one or more user interface controls. Also, in some embodiments, query engines may be arranged to enable machine/computer services to automatically provide questions. Accordingly, in some embodiments, query engines may be arranged to provide APIs or interfaces that enable clients to communicate questions to query engines.

At block 1608, in one or more of the various embodiments, query engines may be arranged to employ one or more query agents and the one or more subject indexes to generate one or more queries directed at the content systems. As described above, query agents may be logical containers comprised of one or more data structures that include instructions for executing one or more actions that enable questions to be answered. In some embodiments, query engines may be arranged to select one or more query agents depending on one or more factors, such as question type, subject matter, content system type, or the like. In some embodiments, two or more query agents may be employed in sequence such that responses from query agent may be provided to a subsequent query agent. Further, in some embodiments, two or more query agents may be configured to iteratively process inputs/responses until a candidate answer may be generated (if possible). In some embodiments, query engines may provide user interfaces that enable users to iteratively modify or adapt questions based on candidate answers provided by query engines.

Also, in some embodiments, one or more automated services may be configured to programmatically submit questions to query engines. For example, in one or more of the various embodiments, a separate service may be configured to submit questions, such as "how many users logged into server A in the past 24 hours?" to enable the service to automatically update a dashboard or other reports based on the answers provided by query engines.

At block 1610, in one or more of the various embodiments, query engines may be arranged to generate an answer to the question based on one or more responses from the query agents. In some embodiments, query agents may be arranged to provide responses that may be forwarded or adapted as input to other query agents. Accordingly, in some embodiments, query engines may be arranged to generate one or more candidate answers to questions based on one or more responses from one or more query agents. In some embodiments, query engines may be configured to employ one or more specialized query agents that examine responses or proposed answers to determine if the answer may be provided to the client that submitted the original question.

Next, in one or more of the various embodiments, control may be returned to a calling process.

Figure 17:
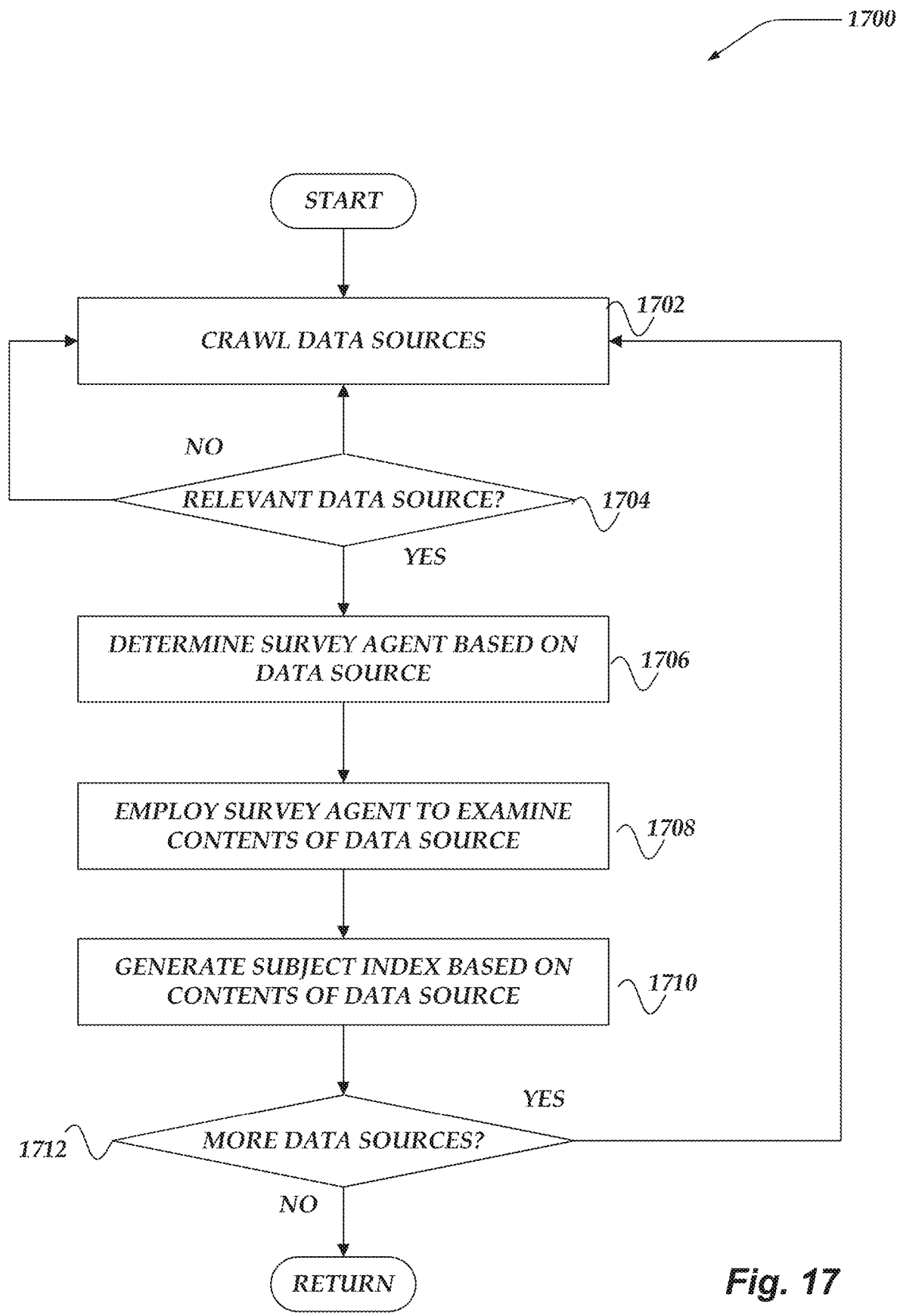
FIG. 17 illustrates a flowchart of a process for surveying security environments in accordance with one or more of the various embodiments.

FIG. 17 illustrates a flowchart of process 1700 for surveying security environments in accordance with one or more of the various embodiments. After a start block, at block 1702, in one or more of the various embodiments, survey engines may be arranged to crawl one or more data sources associated with one or more content systems. In one or more of the various embodiments, survey engines may be configured to access one or more content systems. In some cases, for some embodiments, such configuration may include providing credentials or other authorizations that enable survey engines to access data stores associated with content systems. For example, in some cases, survey engines may be associated with user identities or user roles that may have privileges to access the content systems of content system data stores.

In some embodiments, survey engines may be arranged to scan computing/networking environments for relevant content systems. For example, survey engines may be configured to scan computing environments to identify which content systems may be available. For example, survey engines may be configured to employ directory services, network information services, LDAP, registry services, or the like that may enable content systems to be identified or otherwise located in a computing environment. Also, in some embodiments, survey engines may be arranged to provide user interfaces that enable users or administrators to manually configure survey engines to examine one or more particular content systems. In some embodiments, survey engines may be arranged to provide user interfaces that display a collection of candidate content systems that may have been identified. Accordingly, in some embodiments, users may be enabled to select which content systems should be surveyed.

At decision block 1704, in one or more of the various embodiments, if the data source may be relevant, control may flow to block 1706; otherwise, control may loop back to block 1702. In some embodiments, content systems may include many different data sources. For example, in some cases, content systems (e.g., SIEMs) may organize data sources into tables some of which may be unrelated to security policies. Likewise, in some embodiments, messaging systems may include one or more folders that may be omitted from surveying. For example, in some embodiments, messaging systems may include data sources that may store messages classified as spam or trash such that those data sources may be considered irrelevant.

Also, in some embodiments, query engines may conduct an initial evaluation of a data sources or tables to determine or confirm if they may be irrelevant. Also, in some embodiments, survey engines may be arranged to provide user interfaces that enable administrators to expressly designate one or more data sources as irrelevant or otherwise excluded from a survey.

In one or more of the various embodiments, survey engines may be arranged to employ survey agents configured for evaluating the relevance of a data source. For example, in some embodiments, a survey agent may be configured to employ or generate prompts that are configured to train a generative artificial intelligence to determine if a data source may be relevant.

At block 1706, in one or more of the various embodiments, survey engines may be arranged to determine one or more survey agents based on the data source. As described above, survey systems may include more than one survey agents each directed to different types of content systems or data source within particular content systems. For example, in some embodiments, if a content system exposes APIs or interfaces for access its data, survey engines may employ particular survey agents that may be configured or adapted to those APIs or interfaces. Accordingly, in some embodiments, survey engines may be arranged to categorize or classify data sources, folders, tables, or the like, to determine which survey agents should be used. In some embodiments, survey engines may be arranged to employ a top level query agent that performs the initial classification of data sources which may be used to select other query agent that perform the actual survey.

At block 1708, in one or more of the various embodiments, survey engines may be arranged to employ the survey agents to examine the contents of the data source. As described above, survey agents may be arranged to execute one or more actions directed to examining data sources or the contents of data sources. In some embodiments, survey agents may be arranged to perform one or more actions to determine one or more features or one or more characteristics of the data sources being surveyed.

In some embodiments, one or more survey agents may be organized hierarchically such that higher level survey agents may select one or more lower level survey agents that may execute actions. For example, in some embodiments, a first survey agent may identify all of the tables used by a SIEM content system then other survey agents may be assigned to examine the individual tables. Accordingly, in some embodiments, two or more survey agents may be enabled to execute in parallel. For example, a first survey agent may determine a list of SIEM table while two or more other survey agents may be directed to examine each table.

In some embodiments, survey agents may be arranged to execute particular actions to examine data sources depending on the type of data source. For example, if the data source may be a table with explicit columns or rows the survey agent may include instructions for examining table meta-data or table structural information, such as, column count, column data types, number of rows, or the like. Also, in some embodiments, survey agents designated for examining log files, messages, or other unstructured data may be configured to execute NLP, machine learning classification, or the like, to determine features or characteristics of the files, messages, or unstructured data. In some embodiments, survey agents may be arranged to receive or generate prompts that may be provided to generative artificial intelligence, such as large language models to train them to determine or characterize features of the data sources.

At block 1710, in one or more of the various embodiments, survey engines may be arranged to generate one or more subject index entries based on the contents of the data source. In some embodiments, the product of a survey may be a subject index entry associated with the surveyed data sources. In some embodiments, in some cases, there may be a one-to-one mapping of subject index entries to data sources (or tables). Also, in some embodiments, one subject index entry may be associated with more than one data source. Also, in some embodiments, particular individual data sources may be associated with more than one subject index entry.

At decision block 1712, in one or more of the various embodiments, if there may be more data sources, control may loop back to block 1702. In some embodiments, survey engines may be arranged to iteratively scan or progressively scan some or all of the data sources associated with a content system. For example, if the content system being surveyed may be a file system, survey engines may be configured to automatically traverse the file system starting at a designated root directory.

Likewise, in some embodiments, survey agents may be arranged to submit queries to content systems to obtain meta-data (e.g., schema information, or the like) to guide surveys of data in the content systems. For example, in some embodiments, a survey agent for a SIEM may be configured to request a list of tables that may be employed to identify individual tables to survey.

Next, in one or more of the various embodiments, control may be returned to a calling process.

Figure 18:
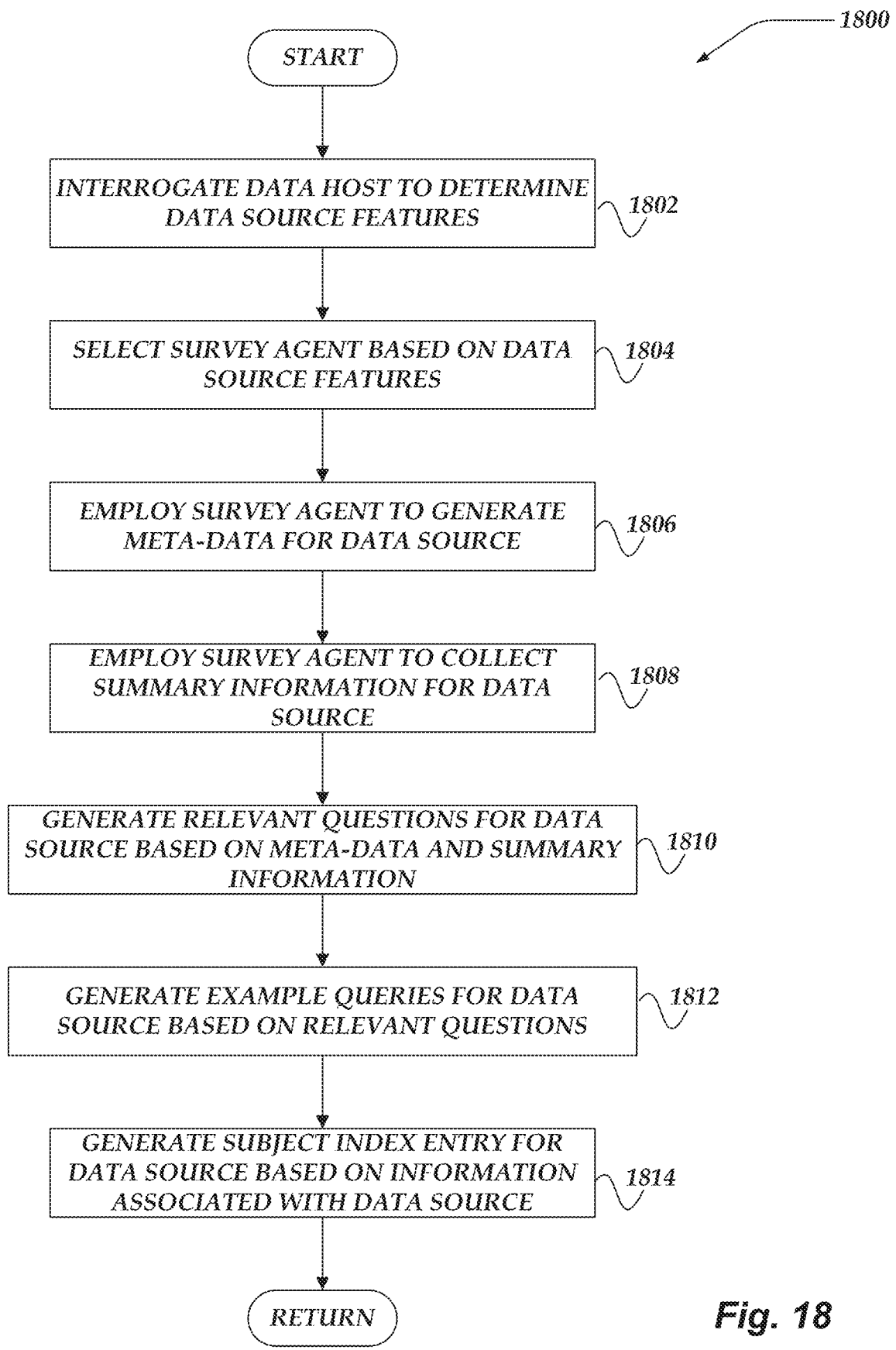
FIG. 18 illustrates a flowchart of a process for surveying security environments in accordance with one or more of the various embodiments.

FIG. 18 illustrates a flowchart of process 1800 for surveying security environments in accordance with one or more of the various embodiments. After a start block, at block 1802, in one or more of the various embodiments, survey engines may be arranged to interrogate content system data hosts to determine data source features. In some embodiments, survey engines may be arranged to execute one or more instructions for collecting information that may be used to identify a content system. For example, in some embodiments, a survey agent may be arranged to iterate over two or more test API calls to determine initial information about a content system. For example, if the content system may be a SIEM, a survey agent may be configured to execute one or more API calls to confirm the make, model, or version of the SIEM. In some embodiments, error responses, timeouts, API not found responses, or the like, may be interpreted to exclude one or more products from consideration.

In some embodiments, survey engines may provide user interfaces that enable users to select the type of content system or class of a content system. Also, in some cases, for some embodiments, survey engines may present a list of discovered content systems that may be detected in the computing environment. Accordingly, in some embodiments, a user may be enabled to select one or more content systems of interest.

At block 1804, in one or more of the various embodiments, survey engines may be arranged to select one or more survey agents based on one or more features of the data sources. In some embodiments, survey engines may be arranged to associate survey agents with particular content systems. Accordingly, in some embodiments, survey agents may be configured to employ APIs or interfaces provided by the particular content systems. In some embodiments, suites or collections of survey agents may be associated with particular content systems such that the one or more survey agents may designated for surveying the particular content system. Also, in some embodiments, survey engines may be configured to organize survey operations into phases where relevant survey agents may be selected for each phase. Accordingly, in some embodiments, one or more phases may be generic across more than one content system or content system type such that some survey agents may be used for more than one type of content system. For example, a survey agent specialized for a particular content system may provide meta-data and sample row data to a generalized survey agent that may be arranged to determine generalized table related characteristics, such as column data types, cardinality, or the like.

At block 1806, in one or more of the various embodiments, survey engines may be arranged to employ survey agents to generate meta-data associated with the data source. As described above, survey engines may be arranged to employ survey agents to generate subject index entries for surveyed data sources, tables, data objects, or the like. Accordingly, in some embodiments, one or more survey agents may be specialized for determining meta-data associated with the data sources. In some embodiments, some meta-data fields may be common across different content systems to different data source types. For example, system provided identifiers, content system name/description, time of last update, or the like, may be common to more than one type of content system or data source.

At block 1808, in one or more of the various embodiments, survey engines may be arranged to employ survey agents to collect summary information for the data source. In some embodiments, survey agents may be arranged to execute one or more actions to generate various subject index entry fields that represent one or more characteristics of the data source. In some embodiments, survey agents directed for summarization may vary depending on the type of content system or data source. For example, if the data source is a table or table-like, the survey agent may be configured to generate rows counts, column-by-column cardinality, column data type information, sample rows, or the like, that may provide a sketch of the underlying table. Also, for example, if the content system being surveyed may be a messaging system, summary information may be generated for conversations (e.g., groups of related messages), parties to the conversation, sample message bodies, subject/concept of messages or conversations, or the like.

In some embodiments, survey agents may employ one or more survey models, including generative artificial intelligence to determine values for one or more subject index entry fields. Accordingly, in some embodiments, survey engines or survey agents may be configured to generate one or more prompts that may be submitted to train generative artificial intelligence in real-time to provide values for one or more subject index field values.

At block 1810, in one or more of the various embodiments, survey engines may be arranged to generate relevant example questions based on the meta-data and subject information. In some embodiments, one or more survey agents may be arranged to generate example questions that may be associated with a data source or message conversation. For example, in some embodiments, one or more survey agents may be configured to employ one or more survey models that may be configured to infer or extract the concept or subject associated with a conversation or data table. In some embodiments, survey models may be arranged to employ heuristics, NLP, large language models, or the like, or combination thereof to infer the main subjects or concepts associated with data sources.

At block 1812, in one or more of the various embodiments, survey engines may be arranged to generate one or more example queries for the data source based on the example questions. In some embodiments, queries may be statements or expressions that conform to a particular query language or format for a content system. For example, if a SIEM has a proprietary querying language, survey engines may generate queries that may be associated with one or more particular example questions. For example, if an example question was "How many time was server X accessed today?" a survey agent may generate a query such as "SELECT count(*) FROM Access Record WHERE Server_ID=? AND Time_Of_Access is Today" for a data source that supports SQL or SQL-like queries.

In some embodiments, survey agents may employ generative artificial intelligence to predict queries for example questions. For example, in some embodiments, survey engines may be arranged to generate input prompts that train a large language model to generate a query to answer the example question such that the query conforms to the query language of the content system.

Also, in some embodiments, survey engines may be arranged to employ compilers or transpilers that use lexers, parsers, abstract syntax trees, or the like, to generate queries for some content systems.

Also, in some embodiments, survey engines or survey agents may incorporate libraries, scripts, or the like, as queries. For example, if the content system may be a file system, a query to find a file with certain keywords in it may be a script that scans files in a file system for the keywords rather than query statement in a query language.

Further, in some embodiments, survey engines may be arranged to generate support mechanisms such as intermediate indexes that may be incorporated into queries.

In general, for some embodiments, survey agents used for generating sample queries may be directed to particular content systems or data sources. Thus, in some embodiments, the particular mechanism for generating sample queries for answering example questions may vary depending on the type of content system or data source. Accordingly, in some embodiments, survey engines may be arranged to employ survey agents, prompts, prompt templates, or the like, that may be provided via configuration information to a account for local circumstances or local requirements.

At block 1814, in one or more of the various embodiments, survey engines may be arranged to generate a subject index entry based on the information associated with the data source. As described above, survey engines may generate a subject index to store the summary information determined from surveys. Further, as mentioned above, the structure or fields included in a subject index entry may vary depending on the content system, data source, data source type, or the like. Accordingly, in some embodiments, one or more survey agents may be directed to generate subject index entries that may be stored in a subject index. In some cases, different survey agents may be specialized for subject index entries for particular content systems, data sources, data source types, or the like.

In some embodiments, subject index entries may include one or more fields the represent the subjects or concepts that the subject index entry may be relevant to. In some embodiments, the particular subject or concept may be selected from an ontology of relevant subject/concept items. For example, in some embodiments, a survey agent may be arranged to ask a generative artificial intelligence to select the three most relevant subjects to associate with a data source or table. In this example, for some embodiments, an input prompt may be generated to include meta-data (e.g., column names, column data types, file name, table name, or the like) and sample data for a data source and the ontology of subjects such that the prompt asks an large language model to identify the most relevant subjects from the ontology.

Next, in one or more of the various embodiments, control may be returned to a calling process.

Figure 19:
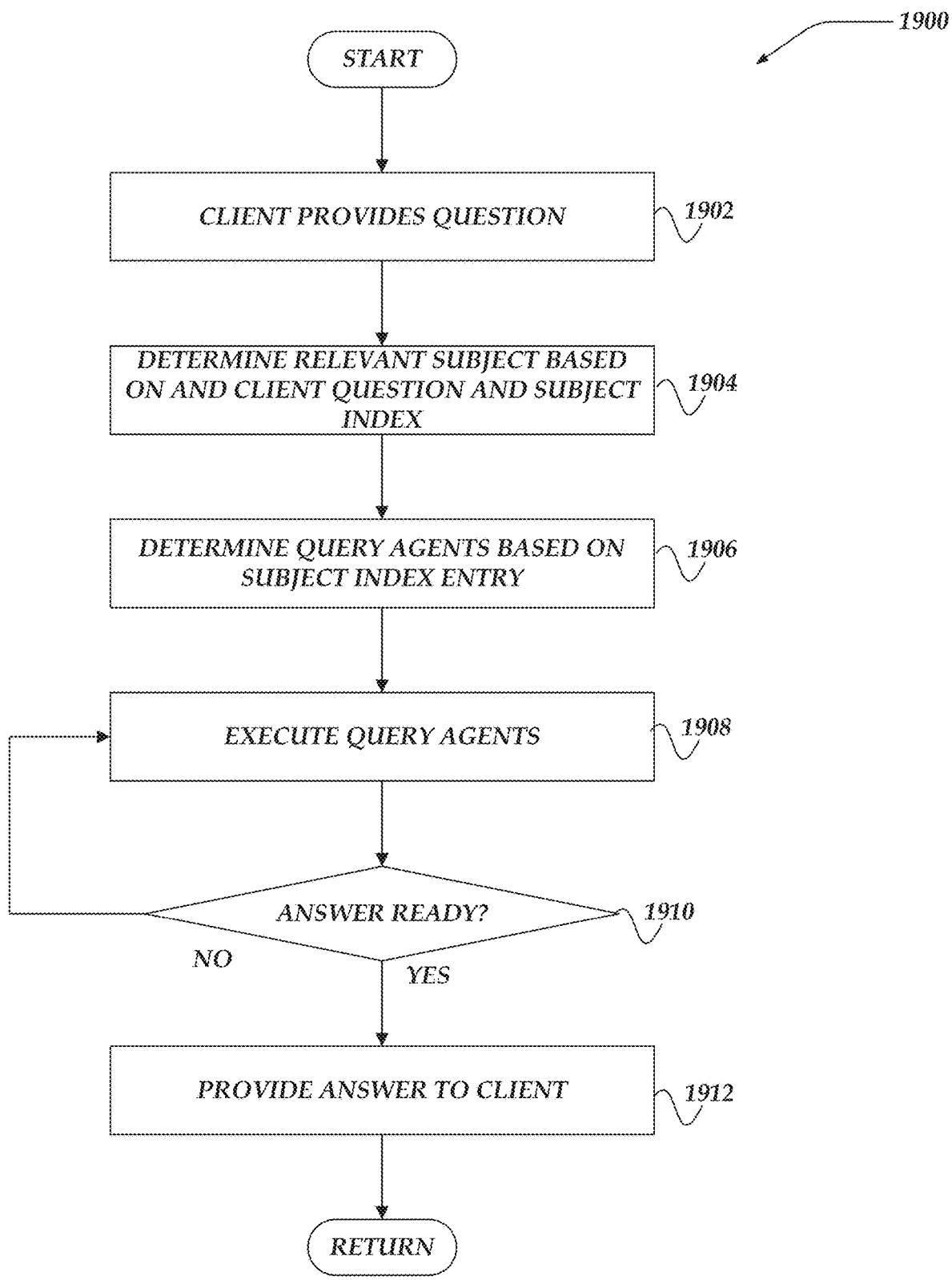
FIG. 19 illustrates a flowchart of a process for surveying security environments in accordance with one or more of the various embodiments.

FIG. 19 illustrates a flowchart of process 1900 for surveying security environments in accordance with one or more of the various embodiments. After a start block, at block 1902, in one or more of the various embodiments, client applications may provide a question to a query engine. As described above, in some embodiments, systems for surveying security environments may provide user interfaces that enable users to provide questions directed to the surveyed content systems. Also, in some embodiments, query engines may be arranged to expose APIs or interfaces that enable services or applications to automatically submit questions.

In some embodiments, often questions may be provided using natural language statements or expressions. However, in some embodiments, questions may include or be expressed using query languages, set notation, mathematical notations, data structures, or the like, or combination thereof. In some cases, questions may include a mix of natural language, query language, mathematical expressions, computer language code, or the like.

At block 1904, in one or more of the various embodiments, query engines may be arranged to determine one or more relevant subject index entries based on the question and subject index. In some embodiments, query engines may be arranged to attempt to match questions with subject index entries. In some embodiments, subject index entries may be employed to determine which data sources should be used for answering the question.

In one or more of the various embodiments, query engines may be arranged to employ conventional or customized NLP for determining the one or more subject index entries that may match with a question. For example, in some embodiments, query engines may be arranged to employ NLP to match subject index entries based on similarity scores between the question and example questions included in subject index entries. Also, in some embodiments, query engines may be arranged to employ semantic analysis to determine one or more subjects or concepts associated with a question. Accordingly, in some embodiments, similarity between the subjects. concepts, key words, or phrases extracted from the question and subject, concepts, key words, or phrases associated with subject index entries may be employed to match subject index entries with questions. Further, in some embodiments, query engines may be arranged to provide user interfaces that may enable users to submit hint information using keywords, subject words, concept words, or the like, along with the question. Similarly, in some embodiments, query engines may be arranged to provide APIs or interfaces that enable services to provide hint information along with the question.

At block 1906, in one or more of the various embodiments, query engines may be arranged to determine one or more query agents based on the one or more subject index entries. Similar to how survey agents may be associated with particular content systems or data sources, one or more query agents may be associated with particular content systems of data sources.

Accordingly, in some embodiments, query engines may be arranged to employ information included in subject index entries to determine one or more query agents. In some embodiments, query engines may be arranged to associate query agents with one or more content systems, data source types, subjects, concepts, or the like.

Further, in some embodiments, since some subject index entries may include fields identifying the associated content system, data source, or the like, some subject index entries may be configured to expressly identify one or more query agents that may be associated with the subject index entry.

In some embodiments, query engines may be arranged to match questions with one or more initial query agents that in turn may select additional query agent as the question may be processed. Accordingly, in some embodiments, a query agent may be configured to select a next query agent from among multiple query agents depending on the question or the current status of the analysis of the question. For example, in some embodiments, a first query agent may be selected based on the subject index entry matching the question while that first query agent may be arranged to select from among different intermediate query agents depending on the initial analysis of the question.

At block 1908, in one or more of the various embodiments, query engines may be arranged to execute the one or more query agents. As described above, query agents may be configured with instructions to execute one or more actions for analyzing or answering questions. For example, in one or more of the various embodiments, a query agent may be configured to generate content system specific queries based on the question while a subsequent query agent may be configured to evaluate if the response from the content system to the queries includes information for answering the question. Note, in some cases, for some embodiments, a single query agent may be arranged to execute more than type of analysis for answering a question. However, in some embodiments, query agents may be considered to receive input information and output response information. In some cases, two or more query agents may be chained together such that responses from one query agent may be submitted to another query agent. However, in some embodiments, query engines may be arranged to intervene such that responses from a query agent may be modified or adapted before submitting to a next query agent. For example, in some embodiments, a response from a query agent may be result set from query. Accordingly, in this example, the query engine may take some or all of the result set and include them into a generative artificial intelligence prompt that may be submitted to a next query agent which may submit it to the generative artificial intelligence.

As described above, in some embodiments, query agents may be arranged to generate or employ prompts that may be provided to train generative artificial intelligence to provide responses that may be used for processing or evaluating questions. In some cases, for some embodiments, such prompts may be determined by experiment. Accordingly, in some embodiments, query engines may be arranged to enable one or more prompts or query models to be provided via configuration information to account for local circumstances or local requirements.

At decision block 1910, in one or more of the various embodiments, if the answer to the question may be ready, control may flow to block 1912; otherwise, control may loop back to block 1908. In some embodiments, one or more query agents may be directed to evaluating if the provided question has been answered. In some embodiments, this may be a query agent configured to compare two or more responses from similar but distinct query agents such that if the responses from the different query agents are similar the answer may be considered ready.

Next, in one or more of the various embodiments, control may be returned to a calling process.

Figure 20:
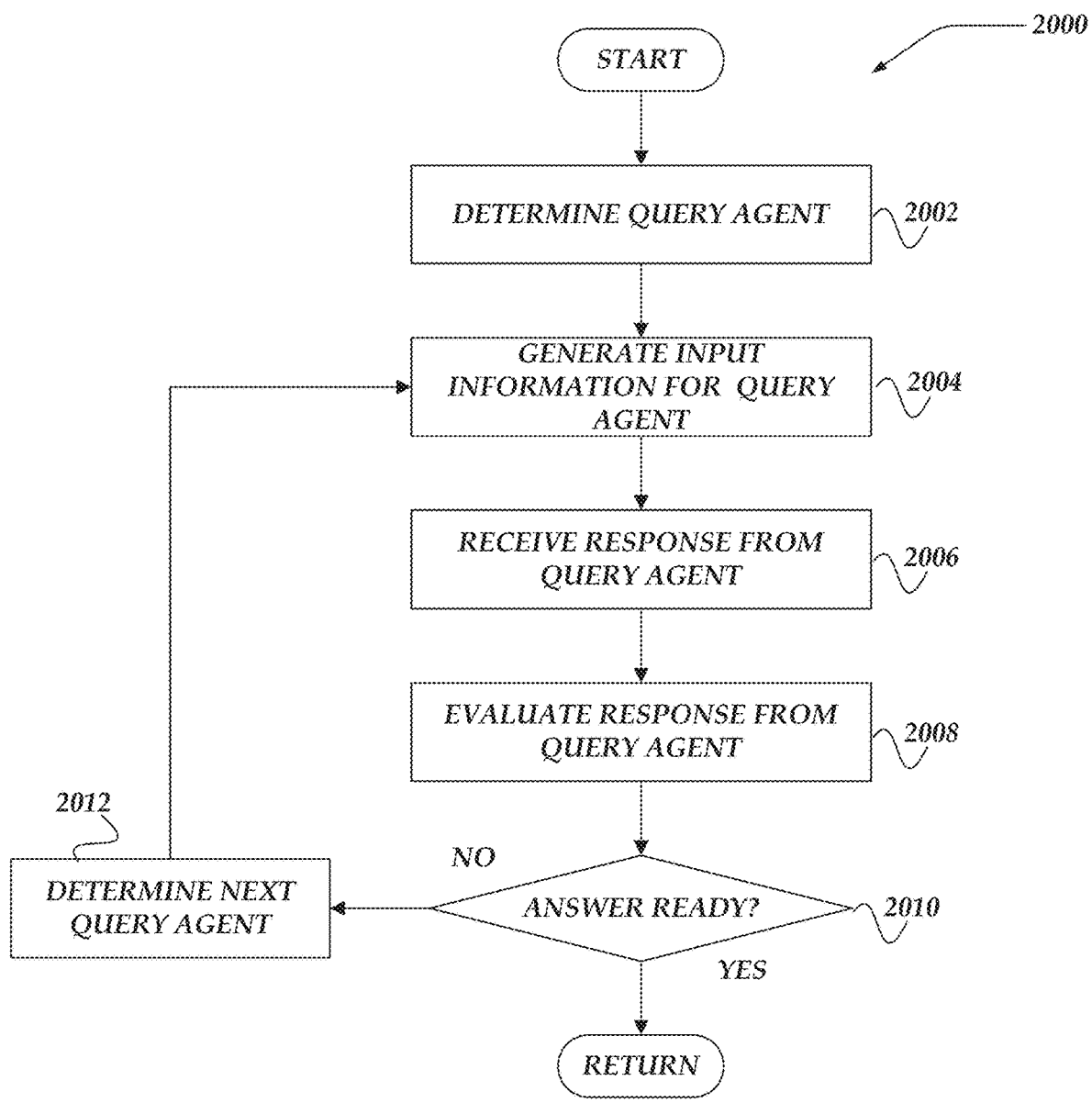
FIG. 20 illustrates a flowchart of a process for surveying security environments in accordance with one or more of the various embodiments.

FIG. 20 illustrates a flowchart of process 2000 for surveying security environments in accordance with one or more of the various embodiments. After a start block, at block 2002, in one or more of the various embodiments, query engines may be arranged to determine a query agent. As described above, in some embodiments, query engines may be arranged to determine one or more query agents based on questions or one or more subject index entries that may be matched to the questions. In some embodiments, an initial query agent may be configured to reference one or more other query agents that may be employed during the processing of questions.

At block 2004, in one or more of the various embodiments, query engines may be arranged to generate input information for the query agent. As described above, query agents may be arranged to accept input information, including prompts. Accordingly, in some embodiments, query engines may be arranged to generate the input information that may conform to the requirements of the particular query agent. In some embodiments, the initial input information may be a prompt that includes the question and the matched subject index entry. Or, in some embodiments, query engines may be arranged to employ prompt templates, or the like, to populate a prompt with prompt fragments based on one or more fields in the subject index entries. Accordingly, in some embodiments, such prompts may be provided to generative artificial intelligence systems to train them to process the questions.

In one or more of the various embodiments, if the input information may be generated, the query engine may enable the query agent to execute its actions.

At block 2006, in one or more of the various embodiments, query engines may be arranged to receive responses from the query agent. As described above, query agent may be configured to generate responses based on the input information, prompts, or the actions performed by the query agent. In some embodiments, one or more query agents may be configured to package the response information into a data structure that may facilitate orderly handling of the response. Also, in some embodiments, some query agent may be configured to return the response as is. For example, in some embodiments, if the query agent executes one or more queries directed to the content system, a query agent may be configured to return the raw results.

At block 2008, in one or more of the various embodiments, query engines may be arranged to evaluate the responses from the query agent. As described above, responses generated by query agents may be evaluated to determine if a candidate answer may be available or if additional processing may be required. In some embodiments, two or more query agents may be configured to operate in a chain or pipeline such that absent intermediate error checking, the answer may not be considered ready until each query agent in the pipeline has been executed.

In some embodiments, query engines may be arranged to employ one or more agents that may execute a sanity check on an answer. For example, a query agent may be configured to use a prompt that trains a large language model to determine if the candidate answer actually answers the question.

At decision block 2010, in one or more of the various embodiments, if the answer may be ready, control may be returned to a calling process; otherwise, control may flow to block 2012. In some embodiments, query engines may be arranged to employ two or more query agents for processing questions. In some cases, the query agent may be known in advance, such as if query engine selected a defined pipeline of query agent to process a question. Also, in some embodiments, one or more query agents may be configured to be controller agents that dynamically select subsequent query agents based on intermediate results. For example, in some embodiments, in some cases, a query agent may provide a response that indicates more processing by other query agents may be required while in other cases, the query agent may determine that the question has been answered.

At block 2012, in one or more of the various embodiments, query engines may be arranged to determine a next query agent for processing the question.

In some embodiments, an initial or intermediate query agent may be configured to select the next query agent (if needed) based on the responses of previously executed query agent. Also, in some embodiments, query agents that may be part of the defined pipeline sequence may determine the next query agent based on the current position/stage in the pipeline.

Also, in some embodiments, a previous response from a query agent may include a directive that indicates the next query agent. For example, in some embodiments, an intermediate may indicate the next query agent based on the results of actions it performed.

Next, in one or more of the various embodiments, control may be returned to a calling process.

Figure 21:
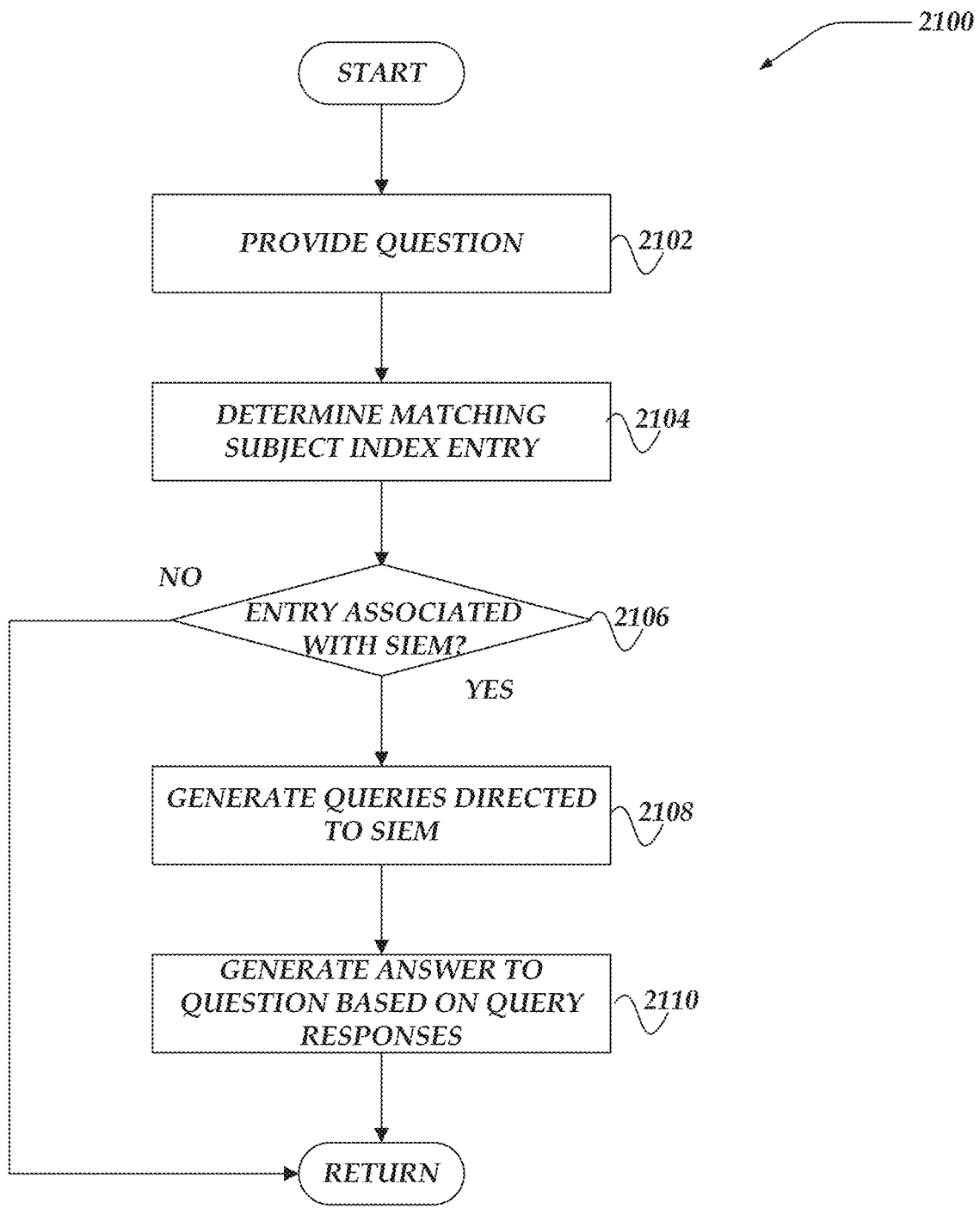
FIG. 21 illustrates a flowchart of a process for surveying security environments in accordance with one or more of the various embodiments.

FIG. 21 illustrates a flowchart of process 2100 for surveying security environments in accordance with one or more of the various embodiments. After a start block, at block 2102, in one or more of the various embodiments, query engines may be provided a question. As described above, query engines may enable one or more questions to be provided via user interfaces or APIs.

At block 2104, in one or more of the various embodiments, query engines may be arranged to determine one or more matching subject index entries. As described above, query engines may be arranged to attempt to match incoming questions with subject index entries.

At decision block 2106, in one or more of the various embodiments, if the subject index entry may be associated with a security information and event management system (SIEM), control may flow to block 2108; otherwise, control may be returned to a calling process. In some embodiments, subject index entries may include fields that indicate the content system associated with the entry. Accordingly, in some embodiments, query engines may interrogate the subject index entry to determine if the entry may be associated with a SIEM.

At block 2108, in one or more of the various embodiments, query engines may be arranged to generate one or more queries directed to the SIEM system. Similar as described above for content systems in general, query engines may be arranged to employ one or more query agents to generate queries that may be employed for answering the questions.

At block 2110, in one or more of the various embodiments, query engines may be arranged to generate an answer to the question based on one or more responses to the queries. Similar as described above for content systems in general, query engines may employ query agents, query models, generative artificial intelligence, or the like, to determine answers to questions.

Next, in one or more of the various embodiments, control may be returned to a calling process.

Figure 22:
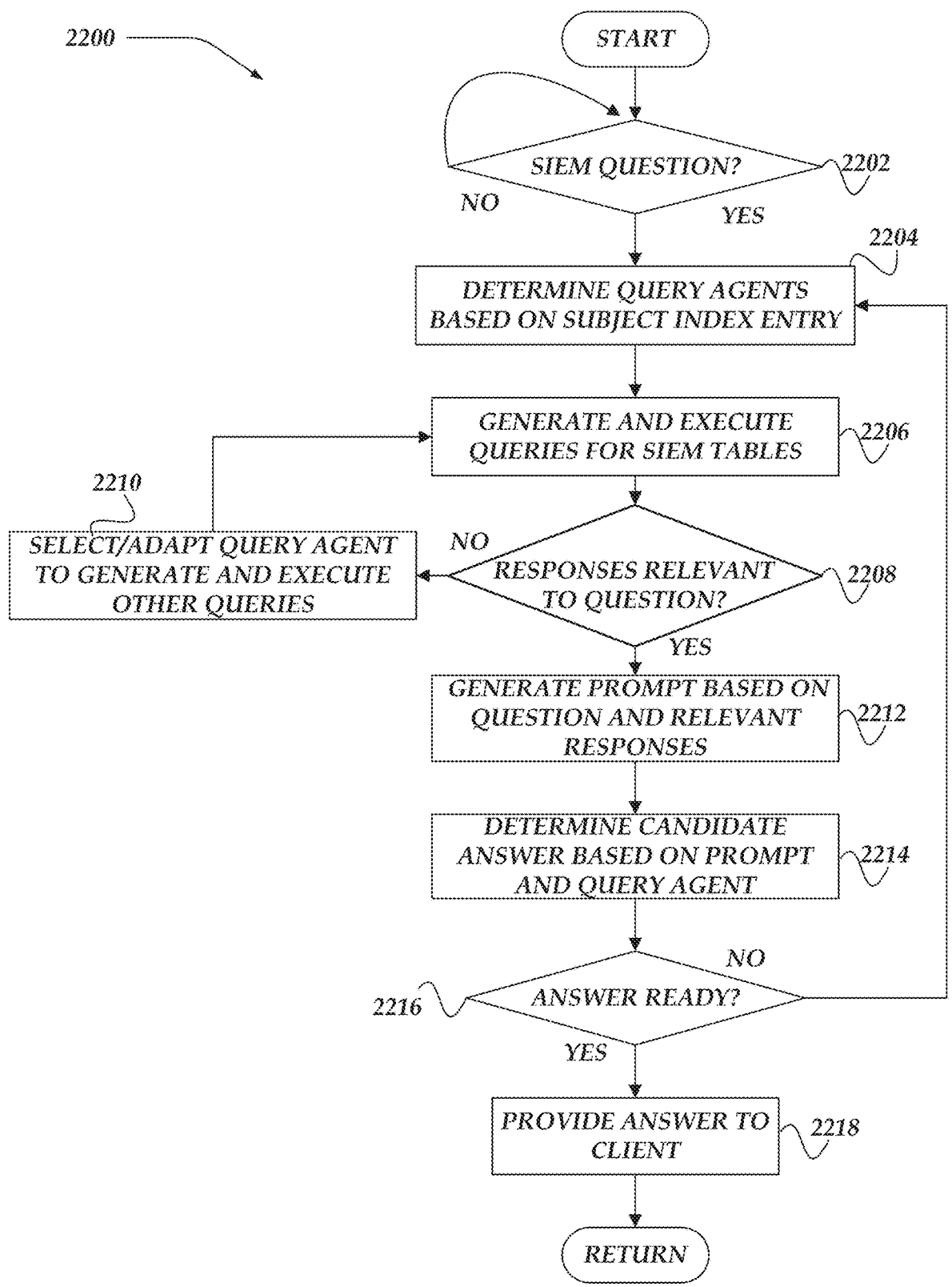
FIG. 22 illustrates a flowchart of a process for surveying security environments in accordance with one or more of the various embodiments.

FIG. 22 illustrates a flowchart of process 2200 for surveying security environments in accordance with one or more of the various embodiments. After a start block, at decision block 2202, in one or more of the various embodiments, if a question associated with a security information and event management (SIEM) system may be provided to a query engine, control may flow to block 2204; otherwise, control may loop back to decision block 2202.

At block 2206, in one or more of the various embodiments, query engines may be arranged to generate and execute one or more queries directed to one or more SIEM tables. In some embodiments, query engines may be arranged to employ one or more query agents that may be configured for interacting with SIEM systems. In some cases, in some embodiments, query engines may be arranged to employ different query agents for different SIEM systems. Accordingly, in some embodiments, one or more query agents may be arranged to employ query models to determine or generate one or more queries that conform to query language supported by the SIEM system. In some embodiments, the relevant subject index entries may include one or more example queries associated with example questions. Accordingly, in some embodiments, prompts may be generated that use the example questions or example queries to provide context to train a generative artificial intelligence to generate queries that may be relevant to incoming questions.

At decision block 2208, in one or more of the various embodiments, if one or more responses to the queries may be responsive to the question, control may flow to block 2212; otherwise, control may flow to block 2210. In some embodiments, query agents may be configured to evaluate the raw query responses to determine if they include information that may be relevant to the question. In some embodiments, query agents or query engines may be arranged to generate a prompt that includes the raw responses and the question. Accordingly, in some embodiments, such prompts may be used to train generative artificial intelligence (e.g., LLMs) to evaluate if the response from the queries includes information that may be used to answer the question.

At block 2210, in one or more of the various embodiments, query engines may be arranged to select or adapt one or more query agents to generate and execute other queries. In some cases, for embodiments, query engines may be arranged to modify or adapt prompts or other input information based on prior results. Also, in some embodiments, query engines may be arranged to select different prompts or query agents to attempt to answer the question. In some cases, in some embodiments, query engines may be configured to employ two or more query agents or prompts such that responses may be compared. Accordingly, in some embodiments, query agents, prompts, or responses may be ranked. Thus, in some embodiments, top ranked responses may be selected for generating answers.

At block 2212, in one or more of the various embodiments, query engines may be arranged to generate input prompts based on the question and relevant responses. In some embodiments, query engines (or query agents) may be arranged to generate prompts that provide some or all query responses as context information for training a generative artificial intelligence to generate an answer for the question.

At block 2214, in one or more of the various embodiments, query engines may be arranged to determine a candidate answer based on the prompt and query agent. In some embodiments, query agents may employ query models (which may include generative artificial intelligence) to generate one or more candidate answers. In some embodiments, query agents or query engines may be arranged to determine a relevance or correctness score for the different candidate answers. For example, in some embodiments, one or more prompts may be generated that includes the question, relevant subject index entries, and the candidate answers to train one or more query models to rank or otherwise assign a score to each candidate answer based on its relevance or correctness.

At decision block 2216, in one or more of the various embodiments, if the answer may be ready, control may flow to block 2218; otherwise, control may loop back to block 2204. In some embodiments, determining if an answer may be ready may include determining that the question cannot be answered. Accordingly, in some embodiments, if a candidate question may be determined to be relevant or correct, it may be considered ready. In some embodiments, relevance or correctness scores may be associated with candidate answers. Accordingly, in some embodiments, query engines may be arranged to employ a query agent (an evaluation agent) to determine if candidate answers may be ready for providing to a client.

At block 2218, in one or more of the various embodiments, query engines may be arranged to provide the selected answer to the client.

Next, in one or more of the various embodiments, control may be returned to a calling process.

Figure 23:
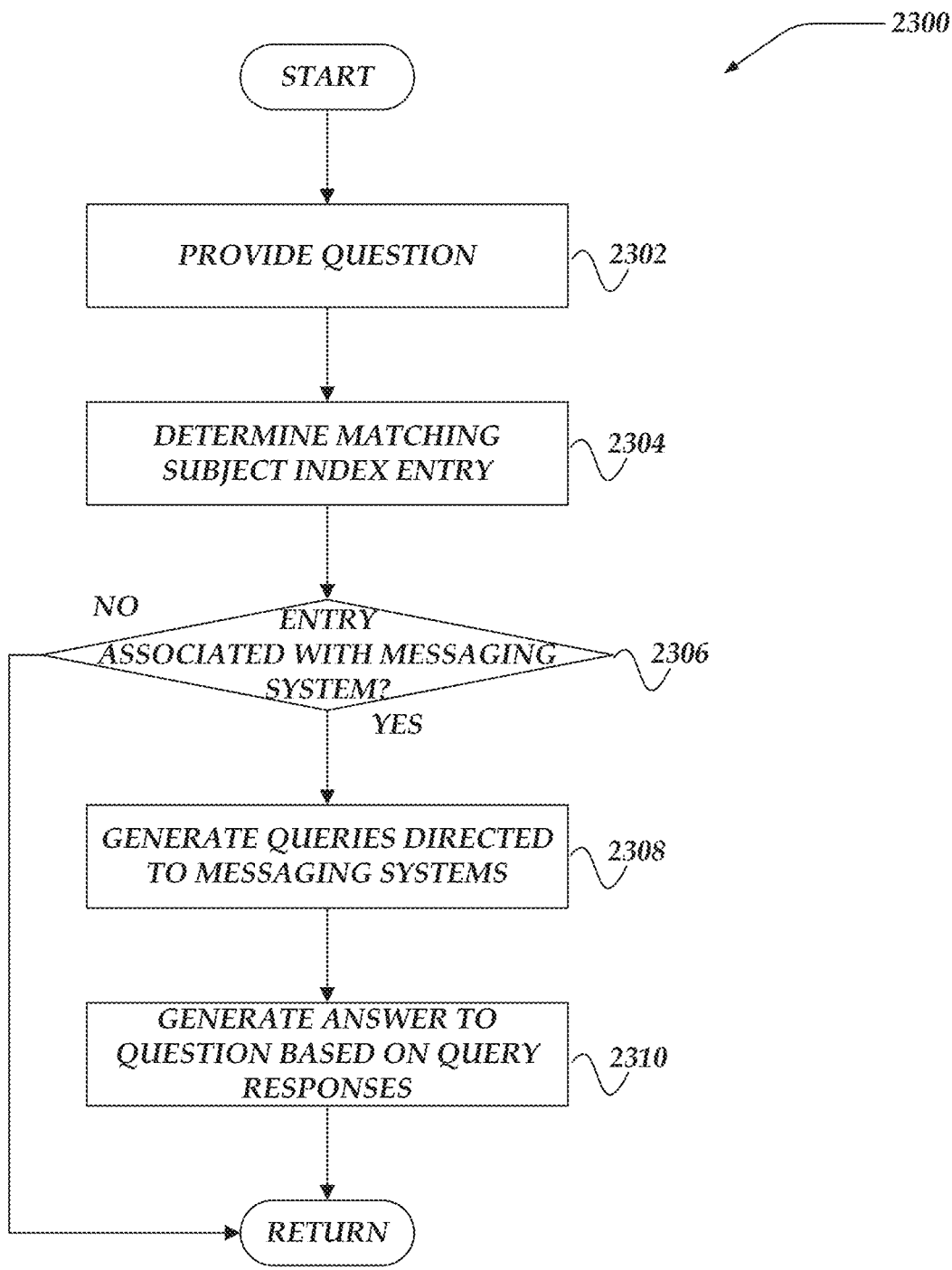
FIG. 23 illustrates a flowchart of a process for surveying security environments in accordance with one or more of the various embodiments.

FIG. 23 illustrates a flowchart of process 2300 for surveying security environments in accordance with one or more of the various embodiments. After a start block, at block 2302, in one or more of the various embodiments, a question may be provided to a query engine. As described above, query engines may enable one or more questions to be provided via user interfaces or APIs.

At block 2304, in one or more of the various embodiments, query engines may be arranged to determine one or more matching subject index entries. As described above, query engines may be arranged to attempt to match incoming questions with subject index entries.

At decision block 2306, in one or more of the various embodiments, if a subject index entry may be associated with a messaging system, control may flow to block 2308; otherwise, control may be returned to a calling process. In some embodiments, subject index entries may include fields that indicate the content system associated with the entry. Accordingly, in some embodiments, query engines may interrogate the subject index entry to determine if the entry may be associated with a messaging system.

Further, in some embodiments, subject index entries for messaging systems may be associated with conversations that include more than one message. Accordingly, in some embodiments, survey engines may be configured to group messages into conversations based on various criteria, including subjects discusses, concepts discussed, participants, time-of-day, or the like.

At block 2308, in one or more of the various embodiments, query engines may be arranged to generate one or more queries directed to the messaging systems. Similar to other content systems, messaging system may support one or more conventional or proprietary query languages. Accordingly, in some embodiments, query agents or query engines may generate prompts that attempt to generate one or more relevant queries that conform to query languages or query facilities or the messaging system. In some embodiments, example queries included in the relevant subject index entries may be included such prompts to train generative artificial intelligence to generate the queries. In some embodiments, query engines (for messaging systems or other content systems) may be arranged to determine prompt fragments, prompt templates, or the like, from configuration information to enable prompt fragments or prompt templates to be updated or adapted as different messaging systems, question types, or the like, may be encountered.

At block 2310, in one or more of the various embodiments, query engines may be arranged to generate an answer to the question based on one or more query responses from the messaging system. As described above, for SIEM system or other content systems, query engines may employ query agent and query models to iteratively generate partial answers, candidate answers, or the like, until an evaluation agent determines the question has been answered. In some embodiments, query engines may provide the answers to the client that provided the question.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring security environments in a computing environment using one or more processors to execute instructions that are configured to cause actions, comprising: employing a survey engine to perform actions, further comprising: generating a subject index that includes a plurality of entries based on a survey of a content system, wherein the plurality of entries are associated with a plurality of data sources of the content system, and wherein each entry is associated with one or more subjects; and employing a query engine to perform actions, further comprising: using a question provided by a client to perform further actions, including: matching the question to one or more entries in the subject index based on a similarity of the question to a subject associated with the one or more entries; determining one or more data sources associated with the question based on the one or more entries; generating a prompt associated with the content system based on the one or more entries, the one or more data sources, and the question; employing one or more query models that are trained by the prompt to obtain data associated with the question from the one or more data sources; generating one or more other prompts based on the data from the one or more data sources, wherein the one or more other prompts retrain the one or more query models to generate one or more candidate answers based on the question and the data from the one or more data sources; generating an evaluation prompt that includes the one or more candidate answers and the question, wherein the evaluation prompt retrains the one or more query models to rank the one or more candidate answers for correctness; and determining one or more answers from the one or more candidate answers based on the ranking of the one or more candidate questions, wherein one or more top ranked candidate answers are provided to the client, further comprising: determining one or more query agents based on one or more of the content system or the one or more data sources; providing one or more of the one or more prompts, the one or more other prompts, or the evaluation prompt to the one or more query agents; and employing the one or more query agents to execute one or more actions to submit the one or more prompts, the one or more other prompts, or the evaluation prompt to the one or more query models, wherein the one or more query agents obtain one or more responses from the one or more query models.

2. The method of claim 1, wherein generating the subject index, further comprises:
   determining one or more subjects associated with each data source based on one or more survey models and one or more survey prompts;
   determining one or more other characteristics of each data source based on the one or more survey models and the one or more survey prompts, wherein the one or more other characteristics include one or more of data source name, column names, column data types, number of records in data sources, cardinality of each column, or one or more sample records; and
   including the one or more subjects and the one or more characteristics of each data source in an entry that is stored in the subject index.

3. The method of claim 1, wherein generating the subject index, further comprises:
- generating a sample question prompt that includes information from a data source;
- submitting the sample question prompt to train a survey model to generate one or more example questions that are associated the data source; and
- including the one or more sample questions in an entry associated with the data source.

4. The method of claim 1, wherein determining the one or more answers from the one or more candidate answers, further comprises:
- determining an absence of suitable candidate answers based on the evaluation prompt, wherein the one or more candidate answers are determined to be incorrect; and
- generating one or more additional prompts based on the data from the one or more data sources, wherein the one or more additional prompts retrain the one or more query models to generate one or more additional candidate answers; and
- generating another evaluation prompt that includes the one or more additional candidate answers and the question, wherein the other evaluation prompt retrains the one or more query models to rank the one or more additional candidate answers for correctness.

5. The method of claim 1, wherein employing the one or more query models, further comprises:
- determining one or more large language models associated with the one or more query models; and
- submitting one or more of the prompt, the one or more other prompts, or the evaluation prompt to the one or more large language models, wherein the one or more of the prompt, the one or more other prompts, or the evaluation prompt train the one or more large language models to generate responses associated with the question.

6. The method of claim 1, wherein training the prompt to obtain data associated with the question, further comprises:
- updating the prompt to include one or more sample queries that conform to a query language that is compatible with the content system;
- employing the prompt to train the one or more query models to generate one or more queries based on the one or more sample queries and the question; and
- submitting the one or more queries to the content system to obtain the data from the one or more data sources.

7. The method of claim 1, wherein the content system is one or more of a security information management and event management system, a messaging system, a project management system, a version control system, or a file system.

8. The method of claim 1, wherein generating the subject index, further comprises:
- traversing the plurality of data sources associated with the content system;
- generating an entry for each data source, wherein a data source includes one or more of a table, a message, a conversation, a collection of messages, a collection of log records, a collection of network transactions, a file, or a file system directory; and
- storing the entry for each data source in the subject index.

9. The method of claim 1, wherein providing the question further comprises:
- providing a natural language interrogative statement from the client, wherein the subject matter associated with the question includes one or more of a security policy, a user behavior, a security metric, or a performance metric.

10. A network computer for monitoring security environments in a computing environment, comprising: a memory that stores at least instructions; and one or more processors that execute instructions that are configured to cause actions, including: employing a survey engine to perform actions, further comprising: generating a subject index that includes a plurality of entries based on a survey of a content system, wherein the plurality of entries are associated with a plurality of data sources of the content system, and wherein each entry is associated with one or more subjects; and employing a query engine to perform actions, further comprising: using a question provided by a client to perform further actions, including: matching the question to one or more entries in the subject index based on a similarity of the question to a subject associated with the one or more entries; determining one or more data sources associated with the question based on the one or more entries; generating a prompt associated with the content system based on the one or more entries, the one or more data sources, and the question; employing one or more query models that are trained by the prompt to obtain data associated with the question from the one or more data sources; generating one or more other prompts based on the data from the one or more data sources, wherein the one or more other prompts retrain the one or more query models to generate one or more candidate answers based on the question and the data from the one or more data sources; generating an evaluation prompt that includes the one or more candidate answers and the question, wherein the evaluation prompt retrains the one or more query models to rank the one or more candidate answers for correctness; and determining one or more answers from the one or more candidate answers based on the ranking of the one or more candidate questions, wherein one or more top ranked candidate answers are provided to the client, wherein the one or more processors execute instructions that are configured to cause actions, further comprising: determining one or more query agents based on one or more of the content system or the one or more data sources; providing one or more of the one or more prompts, the one or more other prompts, or the evaluation prompt to the one or more query agents; and employing the one or more query agents to execute one or more actions to submit the one or more prompts, the one or more other prompts, or the evaluation prompt to the one or more query models, wherein the one or more query agents obtain one or more responses from the one or more query models.

11. The network computer of claim 10, wherein generating the subject index, further comprises:
- determining one or more subjects associated with each data source based on one or more survey models and one or more survey prompts;
- determining one or more other characteristics of each data source based on the one or more survey models and the one or more survey prompts, wherein the one or more other characteristics include one or more of data source name, column names, column data types, number of records in data sources, cardinality of each column, or one or more sample records; and
- including the one or more subjects and the one or more characteristics of each data source in an entry that is stored in the subject index.

12. The network computer of claim 10, wherein generating the subject index, further comprises:

generating a sample question prompt that includes information from a data source;
submitting the sample question prompt to train a survey model to generate one or more example questions that are associated the data source; and
including the one or more sample questions in an entry associated with the data source.

13. The network computer of claim 10, wherein determining the one or more answers from the one or more candidate answers, further comprises:
determining an absence of suitable candidate answers based on the evaluation prompt, wherein the one or more candidate answers are determined to be incorrect; and
generating one or more additional prompts based on the data from the one or more data sources, wherein the one or more additional prompts retrain the one or more query models to generate one or more additional candidate answers; and
generating another evaluation prompt that includes the one or more additional candidate answers and the question, wherein the other evaluation prompt retrains the one or more query models to rank the one or more additional candidate answers for correctness.

14. The network computer of claim 10, wherein employing the one or more query models, further comprises:
determining one or more large language models associated with the one or more query models; and
submitting one or more of the prompt, the one or more other prompts, or the evaluation prompt to the one or more large language models, wherein the one or more of the prompt, the one or more other prompts, or the evaluation prompt train the one or more large language models to generate responses associated with the question.

15. The network computer of claim 10, wherein training the prompt to obtain data associated with the question, further comprises:
updating the prompt to include one or more sample queries that conform to a query language that is compatible with the content system;
employing the prompt to train the one or more query models to generate one or more queries based on the one or more sample queries and the question; and
submitting the one or more queries to the content system to obtain the data from the one or more data sources.

16. The network computer of claim 10, wherein the content system is one or more of a security information management and event management system, a messaging system, a project management system, a version control system, or a file system.

17. The network computer of claim 10, wherein generating the subject index, further comprises:
traversing the plurality of data sources associated with the content system;
generating an entry for each data source, wherein a data source includes one or more of a table, a message, a conversation, a collection of messages, a collection of log records, a collection of network transactions, a file, or a file system directory; and
storing the entry for each data source in the subject index.

18. The network computer of claim 10, wherein providing the question further comprises:
providing a natural language interrogative statement from the client, wherein the subject matter associated with the question includes one or more of a security policy, a user behavior, a security metric, or a performance metric.

19. A processor readable non-transitory storage media that includes instructions configured for monitoring security environments in a computing environment, wherein execution of the instructions by one or more processors on one or more network computers performs actions, comprising: employing a survey engine to perform actions, further comprising: generating a subject index that includes a plurality of entries based on a survey of a content system, wherein the plurality of entries are associated with a plurality of data sources of the content system, and wherein each entry is associated with one or more subjects; and employing a query engine to perform actions, further comprising: using a question provided by a client to perform further actions, including: matching the question to one or more entries in the subject index based on a similarity of the question to a subject associated with the one or more entries; determining one or more data sources associated with the question based on the one or more entries; generating a prompt associated with the content system based on the one or more entries, the one or more data sources, and the question; employing one or more query models that are trained by the prompt to obtain data associated with the question from the one or more data sources; generating one or more other prompts based on the data from the one or more data sources, wherein the one or more other prompts retrain the one or more query models to generate one or more candidate answers based on the question and the data from the one or more data sources; generating an evaluation prompt that includes the one or more candidate answers and the question, wherein the evaluation prompt retrains the one or more query models to rank the one or more candidate answers for correctness; and determining one or more answers from the one or more candidate answers based on the ranking of the one or more candidate questions, wherein one or more top ranked candidate answers are provided to the client, further comprising: determining one or more query agents based on one or more of the content system or the one or more data sources; providing one or more of the one or more prompts, the one or more other prompts, or the evaluation prompt to the one or more query agents; and employing the one or more query agents to execute one or more actions to submit the one or more prompts, the one or more other prompts, or the evaluation prompt to the one or more query models, wherein the one or more query agents obtain one or more responses from the one or more query models.

20. The media of claim 19, wherein generating the subject index, further comprises:
determining one or more subjects associated with each data source based on one or more survey models and one or more survey prompts;
determining one or more other characteristics of each data source based on the one or more survey models and the one or more survey prompts, wherein the one or more other characteristics include one or more of data source name, column names, column data types, number of records in data sources, cardinality of each column, or one or more sample records; and
including the one or more subjects and the one or more characteristics of each data source in an entry that is stored in the subject index.

21. The media of claim 19, wherein generating the subject index, further comprises:

generating a sample question prompt that includes information from a data source;

submitting the sample question prompt to train a survey model to generate one or more example questions that are associated the data source; and including the one or more sample questions in an entry associated with the data source.

22. The media of claim 19, wherein determining the one or more answers from the one or more candidate answers, further comprises:

determining an absence of suitable candidate answers based on the evaluation prompt, wherein the one or more candidate answers are determined to be incorrect; and generating one or more additional prompts based on the data from the one or more data sources, wherein the one or more additional prompts retrain the one or more query models to generate one or more additional candidate answers; and generating another evaluation prompt that includes the one or more additional candidate answers and the question, wherein the other evaluation prompt retrains the one or more query models to rank the one or more additional candidate answers for correctness.

23. The media of claim 19, wherein employing the one or more query models, further comprises:

determining one or more large language models associated with the one or more query models; and submitting one or more of the prompt, the one or more other prompts, or the evaluation prompt to the one or more large language models, wherein the one or more of the prompt, the one or more other prompts, or the evaluation prompt train the one or more large language models to generate responses associated with the question.

24. The media of claim 19, wherein training the prompt to obtain data associated with the question, further comprises:

updating the prompt to include one or more sample queries that conform to a query language that is compatible with the content system;

employing the prompt to train the one or more query models to generate one or more queries based on the one or more sample queries and the question; and submitting the one or more queries to the content system to obtain the data from the one or more data sources.

25. The media of claim 19, wherein the content system is one or more of a security information management and event management system, a messaging system, a project management system, a version control system, or a file system.

26. The media of claim 19, wherein generating the subject index, further comprises:

traversing the plurality of data sources associated with the content system;

generating an entry for each data source, wherein a data source includes one or more of a table, a message, a conversation, a collection of messages, a collection of log records, a collection of network transactions, a file, or a file system directory; and storing the entry for each data source in the subject index.

27. The media of claim 19, wherein providing the question further comprises:

providing a natural language interrogative statement from the client, wherein the subject matter associated with the question includes one or more of a security policy, a user behavior, a security metric, or a performance metric.

* * * * *